United States Patent
Qi et al.

(10) Patent No.: US 10,784,044 B2
(45) Date of Patent: Sep. 22, 2020

(54) OPTIMIZATION OF TRANSMIT AND TRANSMIT/RECEIVE (TRX) COILS FOR WIRELESS TRANSFER OF POWER

(71) Applicant: Integrated Device Technology, Inc., San Jose, CA (US)

(72) Inventors: Tao Qi, San Diego, CA (US); Gustavo Mehas, Mercer Island, WA (US); Chan Young Jeong, San Jose, CA (US); Xinyun Gu, San Jose, CA (US); Nicholaus Wayne Smith, La Mesa, CA (US); Amit D. Bavisi, Los Gatos, CA (US); Daryl Jay Sugasawara, San Jose, CA (US); Aihua Lee, Saratoga, CA (US); Tianze Kan, Encinitas, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 0 days.

(21) Appl. No.: 16/376,955

(22) Filed: Apr. 5, 2019

(65) Prior Publication Data

US 2019/0334391 A1    Oct. 31, 2019

Related U.S. Application Data

(60) Provisional application No. 62/664,792, filed on Apr. 30, 2018, provisional application No. 62/687,981, (Continued)

(51) Int. Cl.
*H01F 38/14*    (2006.01)
*H01F 27/28*    (2006.01)
(Continued)

(52) U.S. Cl.
CPC ............ *H01F 38/14* (2013.01); *H01F 5/003* (2013.01); *H01F 27/006* (2013.01); (Continued)

(58) Field of Classification Search
CPC ................. H01F 38/14; H01F 27/2804; H01F 2027/2809; H01F 5/003
See application file for complete search history.

(56) References Cited

U.S. PATENT DOCUMENTS

| 6,448,873 B1 | 9/2002 | Mostov | |
| 2015/0180440 A1* | 6/2015 | Ishizuka | H01F 27/2804 333/32 |

(Continued)

FOREIGN PATENT DOCUMENTS

| EP | 2871712 A1 | 5/2015 |
| JP | H0737728 A | 2/1995 |

(Continued)

OTHER PUBLICATIONS

European Search Report from European Patent Application No. 19169473.6, dated Sep. 17, 2019. 2019.

(Continued)

*Primary Examiner* — Rexford N Barnie
*Assistant Examiner* — David A Shiao
(74) *Attorney, Agent, or Firm* — Haynes and Boone, LLP

(57) ABSTRACT

In accordance with embodiments of the present invention, a coil design for the transmission of wireless power. In some embodiments, the coil can include a winding with one or more turns of conductive traces mounted on a substrate, wherein the one or more turns include characteristics that enhance operation of the coil. In some embodiments, the winding includes a transmit coil and a receive coil, each coupled to terminals that provide for a transmit functionality and a receive functionality. In some embodiments, the traces (Continued)

are varied in width and/or thickness in order to optimize the inductance and the coil resistance. In some embodiments, parameters of a control circuit coupled to the coil to affect a transmit functionality or a receive functionality can be optimized.

18 Claims, 18 Drawing Sheets

Related U.S. Application Data filed on Jun. 21, 2018, provisional application No. 62/713,432, filed on Aug. 1, 2018, provisional application No. 62/713,435, filed on Aug. 1, 2018, provisional application No. 62/765,358, filed on Aug. 20, 2018, provisional application No. 62/765,353, filed on Aug. 20, 2018, provisional application No. 62/729,914, filed on Sep. 11, 2018.

(51) Int. Cl.
    *H01F 27/00*     (2006.01)
    *H01F 5/00*     (2006.01)
    *H02J 50/10*     (2016.01)
    *H01F 27/29*     (2006.01)

(52) U.S. Cl.
    CPC ......... *H01F 27/2804* (2013.01); *H01F 27/29* (2013.01); *H01F 2027/2809* (2013.01); *H02J 50/10* (2016.02)

(56) References Cited

U.S. PATENT DOCUMENTS

| | | | |
|---|---|---|---|
| 2016/0121732 A1* | 5/2016 | Matsumoto | H02J 5/005 307/10.1 |
| 2016/0211694 A1 | 7/2016 | Wang et al. | |
| 2017/0040688 A1 | 2/2017 | Peralta et al. | |
| 2017/0278619 A1 | 9/2017 | Lee et al. | |
| 2019/0156996 A1* | 5/2019 | Chien | H01F 38/14 |
| 2019/0156997 A1* | 5/2019 | Chien | H01F 38/14 |
| 2019/0304670 A1* | 10/2019 | Chiyo | H02J 50/70 |

FOREIGN PATENT DOCUMENTS

| | | |
|---|---|---|
| JP | 2003109830 A | 4/2003 |
| JP | 2007228794 A | 9/2007 |
| KR | 20130024757 A | 3/2013 |
| KR | 10-1491472 B1 | 2/2015 |
| KR | 20170111654 A | 10/2017 |
| WO | 2004073150 A1 | 8/2004 |

OTHER PUBLICATIONS

Office Action from Korean Patent Application No. 10-2019-0049325, dated Apr. 8, 2020, in English and Korean, pp. 1-13.
Office Action from Japan Patent Application No. 2019-085052, dated May 26, 2020, in English and Japanese, pp. 1-8.

\* cited by examiner

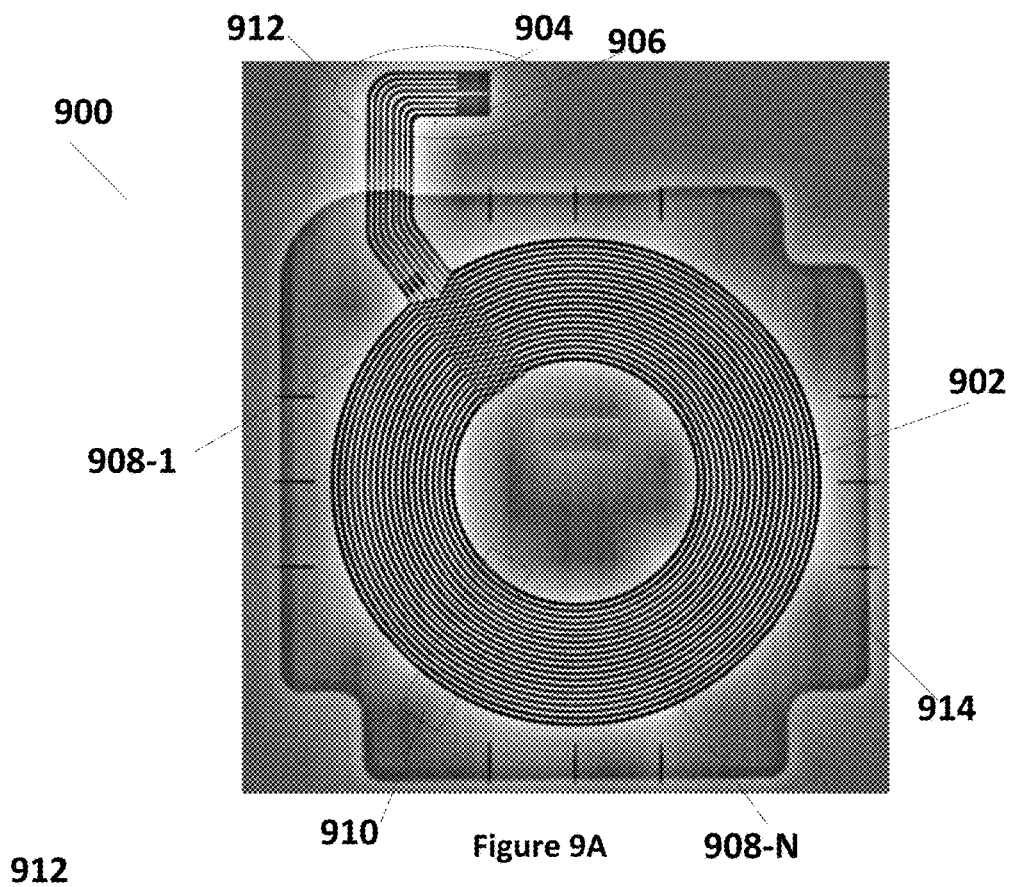
Figure 9A
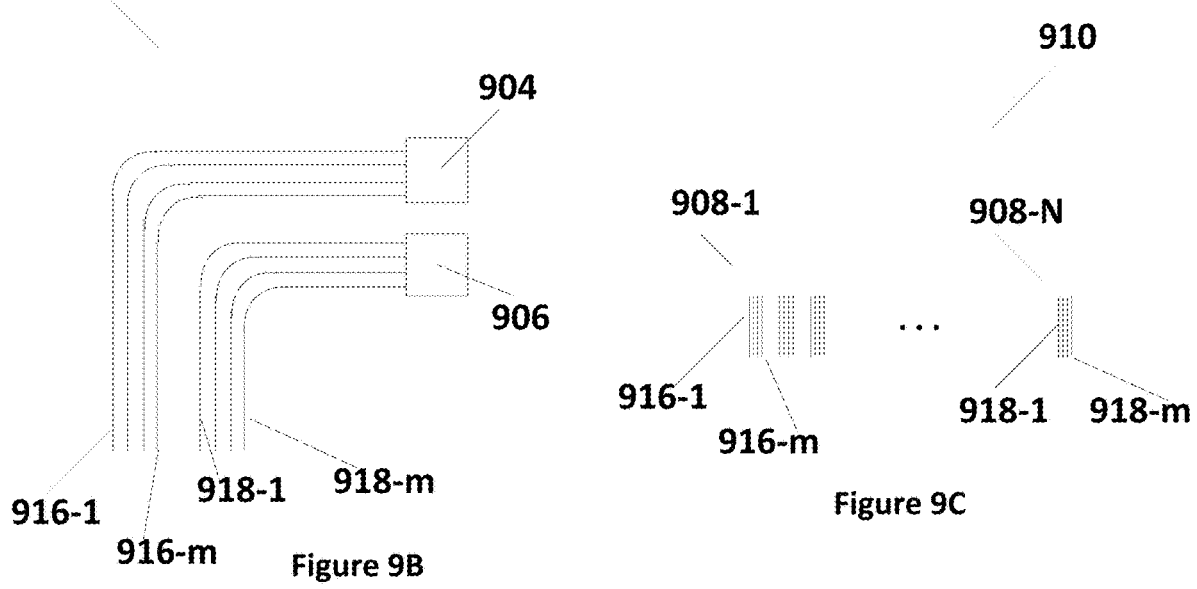
Figure 9B
Figure 9C

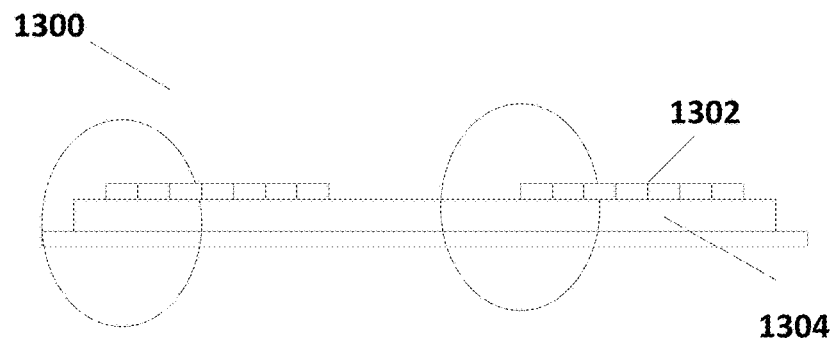
Figure 13A
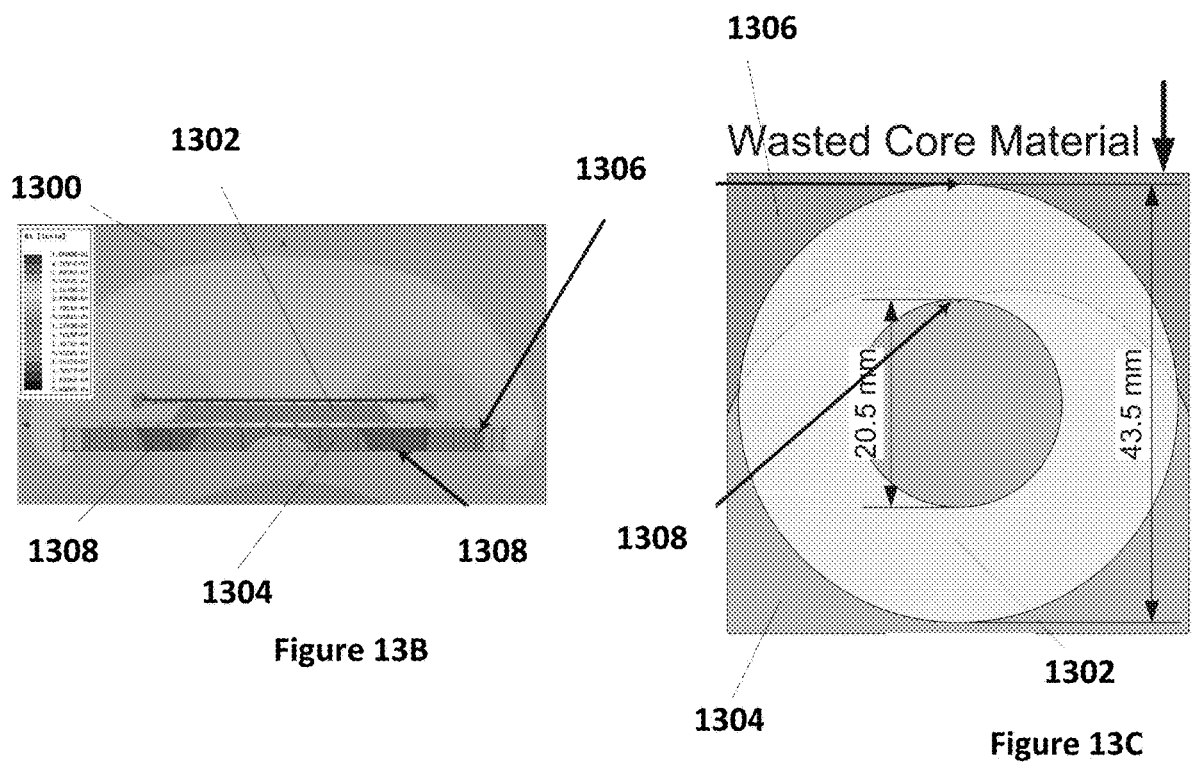
Figure 13B
Figure 13C

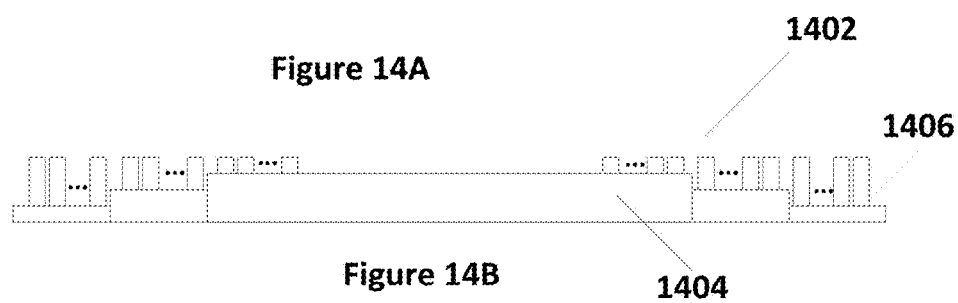
Figure 14A
Figure 14B
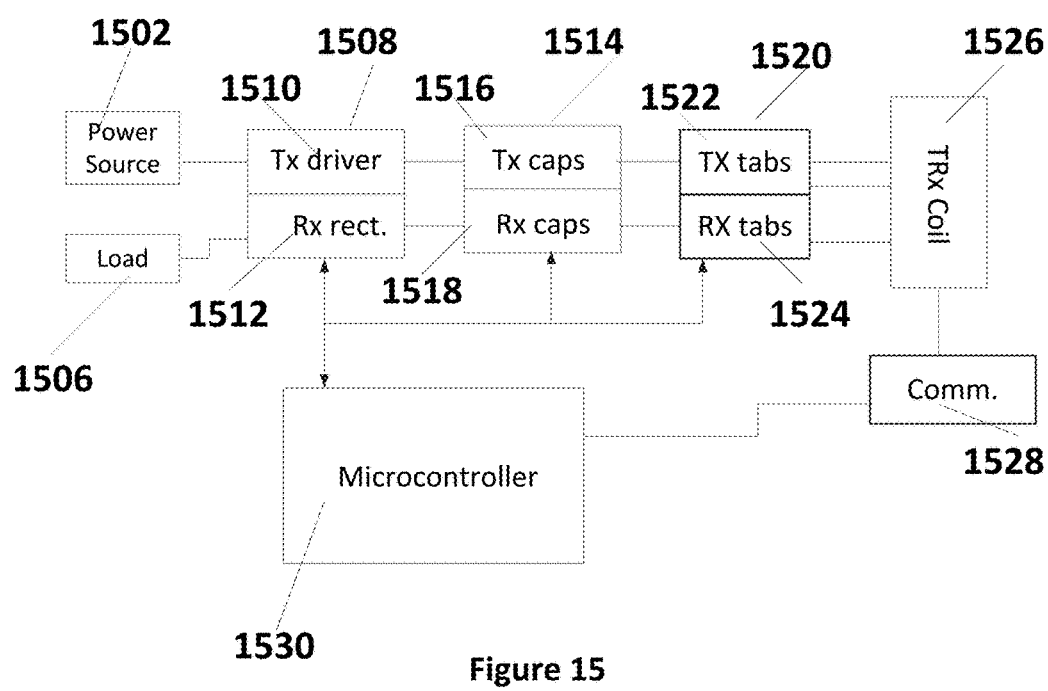
Figure 15

OPTIMIZATION OF TRANSMIT AND TRANSMIT/RECEIVE (TRX) COILS FOR WIRELESS TRANSFER OF POWER

RELATED APPLICATION

The current disclosure claims priority to the following applications: U.S. Provisional Application 62/664,792, entitled "Coil Resistance Optimization" by Gustavo James Mehas, Tianze Kan, Chan Youg Jeong, Tao Qi, and Alison Gu, filed on Apr. 30, 2018 (70107.595PV01, 5286-PR); U.S. Provisional Application 62/687,981, entitled "Optimizing Transmit Coil Design" by Gustavo Mehas, Tao Qi, and Xinyun Gu, filed on Jun. 21, 2018 (70107.604PV01, 5300-PR); U.S. Provisional Application 62/713,432, entitled "Transmit and Receive (TRX) Coil" by Tao Qi, Gustavo Mehas, Chan Young Jeong, Xinyun Gu, and Nicholaus Wayne Smith, filed on Aug. 1, 2018 (70107.609PV01, 5312-PR); U.S. Provisional Application 62/713,435, entitled "Coil Resistance Optimization for Finger Design" by Tao Qi, Gustavo Mehas, Chan Young Jeong, Xinyun Gu, and Nicholaus Wayne Smith, filed on Aug. 1, 2018 (70107.610PV01, 5313-PR); U.S. Provisional Application 62/765,358, entitled "Methods of Magnetic Flux Improvement for TRX coils" by Tao Qi, Gustavo Mehas, Chan Young Jeong, Xinyun Gu, Nicholaus Wayne Smith, Amit D. Bavisi, Daryl Jay Sugasawara, and Aihua Lee, filed on Aug. 20, 2018 (70107.612PV01, 5320-PR); U.S. Provisional Application 62/765,353 entitled "System Optimization Methods of TRX Functioning Coils" by Tao Qi, Gustavo Mehas, Chan Young Jeong, Xinyun Gu, Nicholaus Wayne Smith, Amit D. Bavisi, Daryl Jay Sugasawara, and Aihua Lee, filed on Aug. 20, 2018 (70107.613PV01, 5321-PR); and U.S. Provisional Application 62/729,914, entitled "Optimizing Transmit Coil Design" by Gustavo Mehas, filed on Sep. 11, 2018 (70107.618PV01, 5388-PR). Each of these application is herein incorporated by reference in their entirety.

TECHNICAL FIELD

Embodiments of the present invention are related to wireless power systems and, specifically, to optimization of wireless power coil designs (transmit coils and receive coils) and oil designs that can be used as both transmit and a receive coil (a TRx coil).

DISCUSSION OF RELATED ART

Mobile devices, for example smart phones, tablets, wearables and other devices are increasingly using wireless power charging systems. In general, wireless power transfer involves a transmitter driving a transmit coil and a receiver with a receiver coil placed proximate to the transmit coil. The receiver coil receives the wireless power generated by the transmit coil and uses that received power to drive a load, for example to provide power to a battery charger.

There are multiple different standards currently in use for the wireless transfer of power. The more common standards for wireless transmission of power include the Alliance for Wireless Power (A4WP) standard and the Wireless Power Consortium standard, the Qi Standard. Under the Wireless Power Consortium, the Qi specification, an inductive coupling system is utilized to charge a single device with the receiver coil circuit. In the Qi standard, the receiving device coil is placed in close proximity with the transmission coil while in the A4WP standard, the receiving device coil is placed near the transmitting coil, potentially along with other receiving coils that belong to other charging devices.

Typically, a wireless power system includes a transmitter coil that is driven to produce a time-varying magnetic field and a receiver coil, which can be part of a device such as a cell phone, PDA, computer, or other device, that is positioned relative to the transmitter coil to receive the power transmitted in the time-varying magnetic field. The transmit coil and the receive coil have different constructions to perform their functions. The construction of these coils can affect the efficiency of the wireless power transfer.

Therefore, there is a need to develop better coil technologies for the wireless transmission of power.

SUMMARY

In accordance with embodiments of the present invention, a coil design for the transmission of wireless power is presented. In some embodiments, the coil can include a winding with one or more turns of conductive traces mounted on a substrate, wherein the one or more turns include characteristics that enhance operation of the coil. In some embodiments, the winding includes a transmit coil and a receive coil, each coupled to terminals that provide for a transmit functionality and a receive functionality. In some embodiments, the traces are varied in width and/or thickness in order to optimize the inductance and the coil resistance. In some embodiments, parameters of a control circuit coupled to the coil to affect a transmit functionality or a receive functionality can be optimized.

These and other embodiments are further discussed below with respect to the following figures.

BRIEF DESCRIPTION OF THE DRAWINGS

FIGS. 9A, 9B, and 9C indicate a coil with fingers.

FIGS. 13A through 13C illustrates further variations of coil design according to some embodiments.

FIGS. 14A and 14B illustrate an embodiment where the thickness of coil traces is varied.

FIG. 15 illustrates a TRx control system according to some embodiments of the present invention.

Figure 1A:
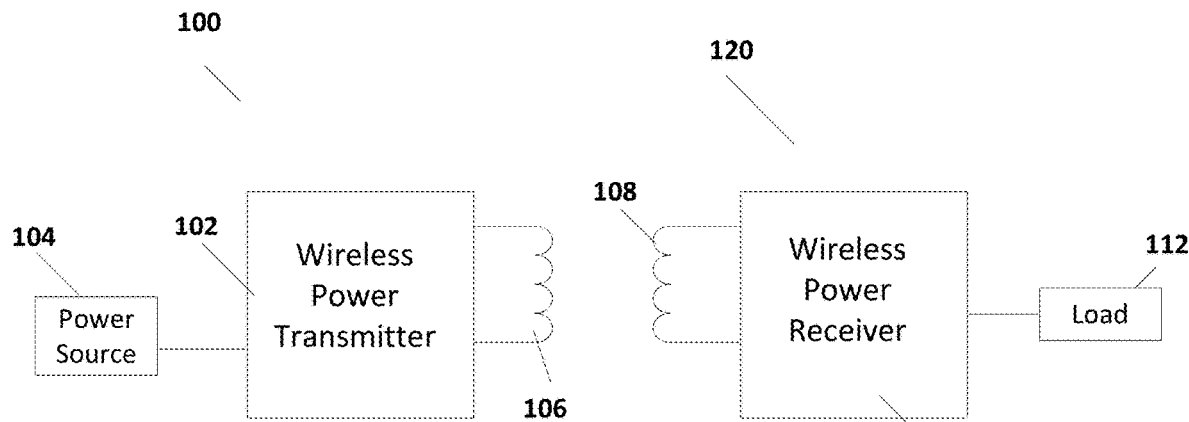
FIG. 1A illustrates a wireless power transmission system.

These figures are further discussed in detail below.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description and the accompanying drawings that illustrate inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Some embodiments of the present invention provide for efficient coils that can be configured as transmit coils or receive coils, depending on application. Such coils can be termed transmit/receive (TRx) coils. Some embodiments are also applicable to coils that are dedicated functionality as a transmit coil or a receive coil. As is discussed further below, the requirements for transmit coils and receive coils are inconsistently different. For example, transmit coils are generally smaller in diameter than receive coils. Further, embodiments of the present invention provide consideration of flux saturation of a ferrite core along with resistance characteristics of traces of the coil turns.

In some embodiments, TRx coils can include one or more coils of wire coupled to a plurality of terminals. The one or more coils of wire are arranged with the plurality of terminals to provide either a transmit functionality or a receive functionality to a transmit/receive system. In some embodiments, unused portions between the multiple coils is used to reduce coil resistance. In some embodiments, coil widths are redistributed according to coil geometries. In some embodiments, coil width is determined according to coil inductances.

A coil includes traces arranged to form the coil. In some embodiments, the width of the traces varies from the inside of the coil to the outside of the coil. In some embodiments, the width of the traces varies to optimize the resistance of the coil. In some embodiments, the windings are circular. In some embodiments, the coil includes inner and outer windings, wherein the width of the traces forming the inner and outer windings vary to optimize resistance.

In accordance with some embodiments of the present invention, a transmit/receive (TRx) coil includes one or more coils of wire configured to operate in a transmit function or a receive function, wherein trace widths of each of the coils is optimized. In some embodiments, the trace widths include two or more widths.

In accordance with some embodiments of the present invention a transmit coil is presented. The transmit coil includes a copper coil that is thinner on inner windings and thicker on outer windings. A corresponding ferrite core on which the coil is mounted can be thicker under the inner windings and thinner under the outer windings. This arrangement can further improve the resistive characteristics of the coils and improve efficiencies.

In some embodiments, each of the multiple turns that make up the coil can include one or more fingers in each turn. The multiple fingers are adjusted in each turn to optimize the coil resistance of the wireless coil. In some embodiments, the multiple fingers are adjusted by adjusting the width in each turn. In some embodiments, the width is larger in the outer turns than it is in the inner turns. In some embodiments, the multiple fingers are adjusted by varying the number of fingers in each turn. In some embodiments, the number of fingers is greater in the outer turns than it is in the inner turns.

In accordance with some embodiments of the present invention, a transmit/receive coil can include one or more coils of wire configured to operate in a transmit function and a receive function, wherein trace widths of each of the coils is optimized. In some embodiments, the trace widths include two or more widths. In some embodiments, upper and lower inner coils are arranged in series and upper and lower outer coils are arranged in parallel. Other methods of optimizing operation can include optimizing the TX operating frequency point, sharing capacitors for Tx mode and RX mode, optimizing the on-the-go voltage, or optimizing the deadtime. In some embodiments, a foreign object may be detected, for example by monitoring power loss, monitoring operating parameters, or monitoring the control error packet.

In accordance with some embodiments of the present invention, efficient transmit and receive (TRx) coils are presented. In accordance with some embodiments, embodiments of TRx coils include one or more coils of wire coupled with a plurality of terminals, wherein the one or more coils of wire are arranged with the plurality of terminals to enhance both a transmit functionality and a receive functionality, depending on which terminals, or tabs, or used. In accordance with some embodiments of the present invention, unused portions between the multiple coils can be used to reduce coil resistance. In some embodiments, coil widths are redistributed according to coil geometries. In some embodiments, coil width is determined according to coil inductances.

In accordance with some embodiments of the present invention, a coil includes traces that form windings (also referred to as turns) arranged to form the coil, wherein a width of the traces varies from the inside of the coil to the outside of the coil. In some embodiments, the width of the traces is varied to optimize the resistance of the coil according to functionality of that portion of the coil. In some embodiments, the windings are circular, although other winding shapes can be used. In some embodiments, the coil includes inner and outer windings, wherein the width of the traces forming the inner and outer windings vary to optimize resistance. In some embodiments, the trace widths include two or more widths such that widths in outer traces are wider than traces in inner traces.

In addition, in some embodiments the thickness of the traces of the coil can be varied. The TRx coil can include windings (turns) with copper traces that are thinner on inner windings and thicker on outer windings. Further, these copper traces can be formed on a ferrite core on which the coil windings are mounted, the ferrite core being thicker under the inner windings and thinner under the outer windings.

In accordance with some embodiments of the present invention, the windings are formed with one or more fingers. The multiple fingers can be adjusted in each turn to optimize coil resistance of the wireless coil. In some embodiments, the multiple fingers are adjusted by adjusting the width in each turn. In some embodiments, the width is larger in the outer turns than it is in the inner turns. In some embodiments, the multiple fingers are adjusted by varying the number of fingers in each turn. In some embodiments, the number of fingers is greater in the outer turns than it is in the inner turns.

In accordance with some embodiments of the present invention, a TRx coil can include upper and lower inner coils (top and bottom layers of coil traces) arranged in series and in another section upper and lower outer coils (top and bottom layers of coil traces) arranged in parallel. In some embodiments, the Tx operating frequency point is optimized. In some embodiments, the driving circuitry includes shared capacitors for Tx mode and Rx mode, optimizing the on-the-go voltage and/or optimizing the deadtime. In some embodiments, a foreign object may be detected, for example by monitoring power loss, monitoring operating parameters, or monitoring the control error packet.

FIG. 1A illustrates a simplified wireless power system that includes a device 100 with a wireless power transmitter 102 and a second device 120 that includes a wireless power receiver 120. As illustrated in FIG. 1A, a wireless power transmitter 102 is coupled to receive power from a power source 104. Wireless power transmitter 102 drives a transmit coil 106 to produce a time-varying electromagnetic field at a frequency. Receiver coil 108 of wireless power receiver 110 couples with the electromagnetic field generated by transmit coil 106 of wireless power transmitter 102 to receive the wireless power that is transmitted. As illustrated in FIG. 1A, receiver coil 108 is coupled to a wireless power receiver 110 which receives power from receiver coil 108 and provides power to a load 112. Wireless power transmitter 102 may be configured to generate a time-varying electromagnetic field in the presence of wireless power receiver 110, which is configured to receive the wireless power transmitted by the wireless power transmitter 102. The elements of the wireless power transmitter 102 and wireless power receiver 110 may vary in size and shape to accommodate power requirements and physical location of wireless power system 100.

Wireless power receiver 110 recovers the power from the time varying electromagnetic field and typically provides DC power input to load 112 of a device that includes wireless power receiver 110 and receive coil 108. Power is transferred when the device is proximate wireless power transmitter 102. In some cases, load 112 may include a battery charger and the device includes a battery.

In some cases, power transmitter device 100 and power receiver device 120 include components formed on printed circuit boards (PCBs). Transmitter coil 106, along with the circuitry of wireless power transmitter 102, can be formed on PCBs of power transmitter device 100. Similarly, receive coil 108 and the circuitry of wireless power receiver 110 is formed on the PCB of power receiver device 120. Transmitter 102 and receiver 120 may each be formed on single chips, which are then mounted on the same or other printed circuit boards in each device.

As is illustrated in FIG. 1A, devices may be provided that include a transmitter or a receiver. Transmit device 100 includes wireless power transmitter 102 and transmit coil 106. Receiver device 120 includes wireless power receiver 110 and receive coil 108. However, in some embodiments, it is useful for a device to be capable of both transmitting wireless power and receiving wireless power, depending on circumstance.

Figure 1B:
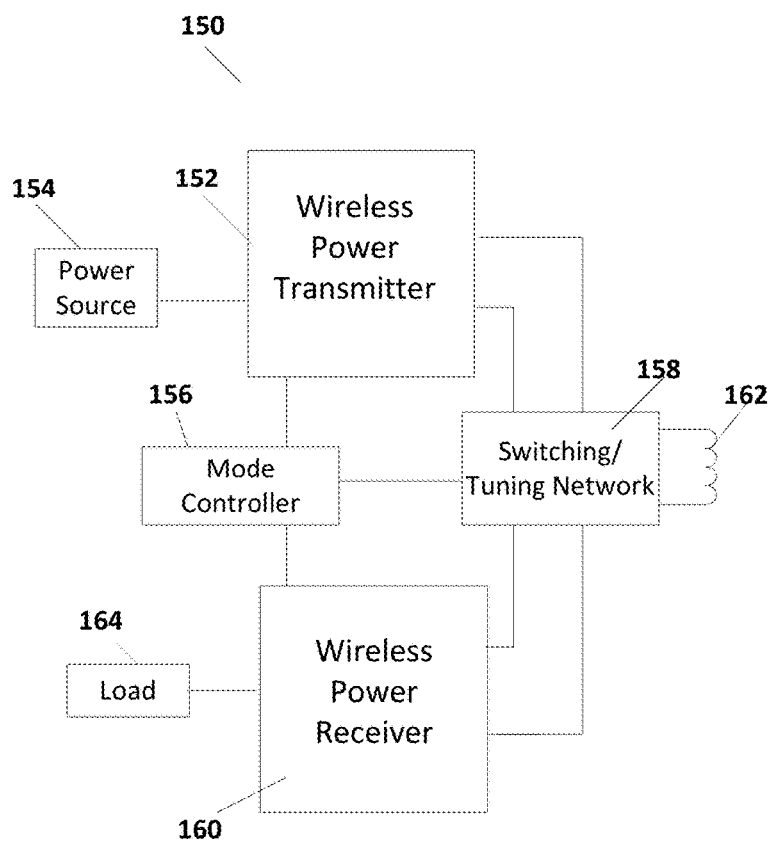
FIG. 1B illustrates a wireless power device control circuit coupled to a TRx coil.

FIG. 1B illustrates a device 150 that includes both the capability of transmitting wireless power and of receiving wireless power. As illustrated in FIG. 1B, device 150 includes a wireless power transmitter 152 and a wireless power receiver 160. Although some embodiments of device 150 can use separate transmission coils and receiver coils (as would be achieved if device 100 and device 120 as illustrated in FIG. 1A were combined into a single device), the example illustrated in FIG. 1B utilizes a single transmit/receive (TRx) coil 162 that is both a transmit coil and a receive coil. TRx coil 162 can be coupled though a switching network 158 to wireless power transmitter 152 and wireless power receiver 160, depending on whether device is operating as a transmitter or a receiver.

As is further illustrated in FIG. 1B, wireless power transmitter 152 is coupled to a power source 154 while wireless power receiver is coupled to a load 164. In some embodiments, power source 154 can be a battery and load 164 can include a battery charger that charges the battery in power source 154.

Wireless power transmitter 152, wireless power receiver 160, and switching network can be controlled by a mode controller 156. Mode controller 156 determines whether device 150 is operating as a transmitter or a receiver and adjusts wireless power transmitter 152, wireless power receiver 160, and switching/tuning network 158 accordingly. In some embodiments, wireless power transmitter 152 and wireless power receiver 160 may share components.

An efficient design of TRx coil 162 is challenging because TRx coil 162 couples into two different systems, which are usually served by a separate Tx coil and Rx coil, each optimized for their respective functions. The two systems, wireless power receiver 160 and wireless power transmitter 152, have different magnetic geometries, which results in different demands on TRx coil 162. A wireless charging Rx coil is usually larger for better magnetic coupling and space freedom of the receiver. A wireless charging Tx coil is usually smaller than the Rx coil for better magnetic coupling. Combining the functionalities into a single coil, TRx coil 162, can result in poor performance for one, or both, functions of the resulting coil. There is currently no system solution or coil in the market that can support a device serving as both a transmitter and a receiver sharing a single coil. As discussed below, some embodiments of the present invention provided for a combined TRx coil that efficiently performs both transmit and receive functions.

Device 150, which includes wireless power transmitter circuit 152, wireless power receiver circuit 160, mode controller 156, switching/tuning network 158, and TRx coil 162, operates to both transmit and receive wireless power. Consequently, TRx coil 162 serves both as a Tx coil to transmit the wireless power and as a Rx coil to receive the wireless power. As discussed above, the design of TRx coil 162 is challenging because TRx coil 162 couples into two different systems, which are usually served by separate Tx and Rx coils, have different magnetic geometries. As discussed above, a wireless charging Rx coil is usually larger for better magnetic coupling and space freedom of the receiver while the wireless charging Tx coil is usually smaller for better magnetic coupling.

As discussed above, TRx coils that can be used as TRx coil 162 have several design problems. When the TRx coil serves as a Tx coil, a small radius is desired so that the magnetic flux can be concentrated at the center area and well coupled to a receiver (usually a watch or another cell phone) Rx coil that is placed proximate to the TRx coil. When the TRx coil serves as an Rx coil, a large radius is desired so that it can pick up more magnetic flux from a transmit coil proximate to the TRx coil. When a TRx coil is designed with small radius, a bad Rx performance (low efficiency and bad space freedom performance) is caused because of low magnetic flux linked to it (or low mutual inductance in other words). When a TRx coil is designed with large radius, the bad Tx performance (low efficiency) is caused because of low magnetic flux it can generated at the center area that can be picked up by another Rx coil (or low mutual inductance in another words).

Further, when TRx coil is designed with small inner radius and large outer radius, it is usually with too high a number of turns, which causes several problems: 1) high coil resistance causing low efficiency; 2) inappropriate mutual inductance and self-inductance causing difficulty on tuning; and 3) taking too much coil area so that other coils such as Near Field Communications (NFC) or Power Matters Alliance (PMA) are not compatible.

Embodiments of TRx coil 162 according to embodiments of the present invention provide for TRx coils that address various aspects of the concerns addressed above. Additionally, switching/tuning network 158 includes tuning capacitors that are used with TRx coil 162 in both transmit mode and in receiver mode. As discussed above, the tuning requirements are very different for these two functions. Using two sets of coils (a Tx coil and a Rx coil) and separate sets of tuning capacitors for each coil greatly complicates the resulting system and requires more circuit components than implementations of embodiments of TRx coil 162. In some embodiments, system (circuit and coil) optimization of device 150 to share coils and the tuning capacitors to form TRx coil 162 can be obtained. For example, in some embodiments switching/tuning network 158 includes Zero Voltage Switching (ZVS) capacitors to be used in Tx mode to improve the Electro-Motive Interference (EMI) performance. Such capacitors further increase the cost of the system. In some embodiments, the ZVS capacitors can be used for other functions such as Rx mode communications capacitors.

In Tx mode, wireless power transmitter 152 can adjust the operating frequency to optimize the wireless transfer of power. Sometimes, more magnetic flux results in better efficiency or larger space freedom. In such cases, wireless power transmitter and switching/tuning network 158 can be optimized for efficiency. In some embodiments, device 150 can be optimized. Further functions, such as foreign object detection (FOD) and deadtime and proper operating points can be optimized.

As discussed above, conventional devices, if they include both a transmit and a receive function, include separate Tx and Rx coils. It is more likely that these devices operate only as a transmit device with a single Tx coil or operate only as a receive device with a single Rx coil. Coils that support the wireless charging function are either Tx coils or Rx coils, where Tx coils are usually smaller than Rx coils to concentrate the magnetic flux at the center and Rx coils are usually larger to pick up more magnetic flux.

Figure 2A:
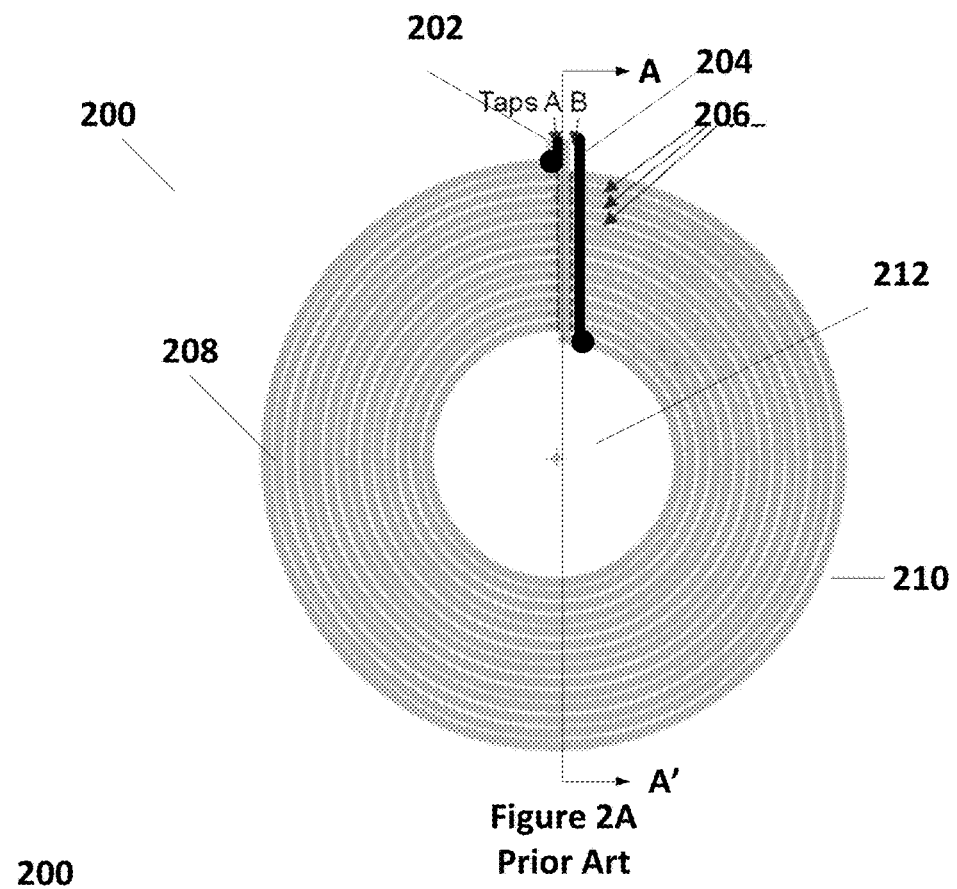
FIGS. 2A and 2B illustrate a parallel-coupled coil.
Figure 2B:
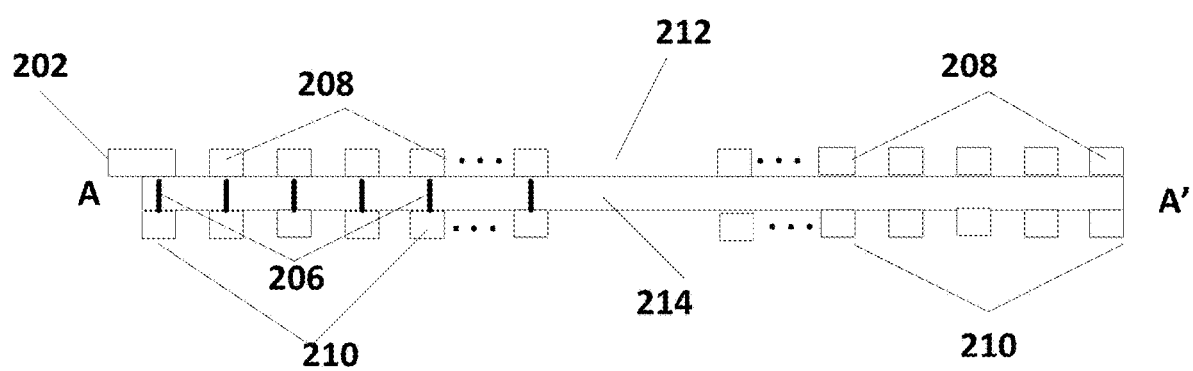

FIGS. 2A and 2B illustrate a parallel coil structure 200 that can be used for either a Tx or Rx coil, although this structure is more commonly used as a Rx coil. As illustrated in FIG. 2A, there is a parallel connection between top layer coil windings 208 and bottom layer coil windings 210. Top layer coil windings 208 and bottom layer coil windings 210 refer to coil traces formed on the top and bottom layers of a substrate 214, for example a printed circuit board (PCB) or flexible printed circuit board (FPCB). As shown in FIG. 2A, coil structure 200 includes two taps, taps 202 and 204, that couple the coil structure 200 to other electronics, as illustrates in FIGS. 1A and 1B above. Connections between tap A 202 and tap B 204 and the coil are illustrated by heavy lines and a dark dot.

As is further illustrated in FIG. 2A, top coil traces 208 are coupled to bottom coil traces 210 through vias 206. FIG. 2B illustrates a cross-sectional view through the line A-A' as illustrated in FIG. 2A. As is illustrated in FIG. 2B, top coil traces 208 and bottom coil traces 210 are situated on the top and bottom of a substrate 214, respectively. Vias 206 through substrate 214 couple each turn in the windings of top coil traces 208 with corresponding bottom coil traces 210. As is illustrated, top coil traces 208 and bottom coil traces 210 are wound around an opening 212 to form coil structure 200. Further, the widths of the top coil traces 208 and bottom coil traces 206 have the same width throughout.

As illustrated in FIGS. 2A and 2B, there is the same coil pattern on the top and bottom layer. As discussed above, vias 206 are used to connect the top and bottom layer coil. The top and bottom layer coils are thereby coupled in parallel. The benefit of this arrangement is that there is lower coil resistance because the top and bottom layer coils are coupled in parallel. However, the lowered number of turns available causes lower magnetic coupling.

Figure 3A:
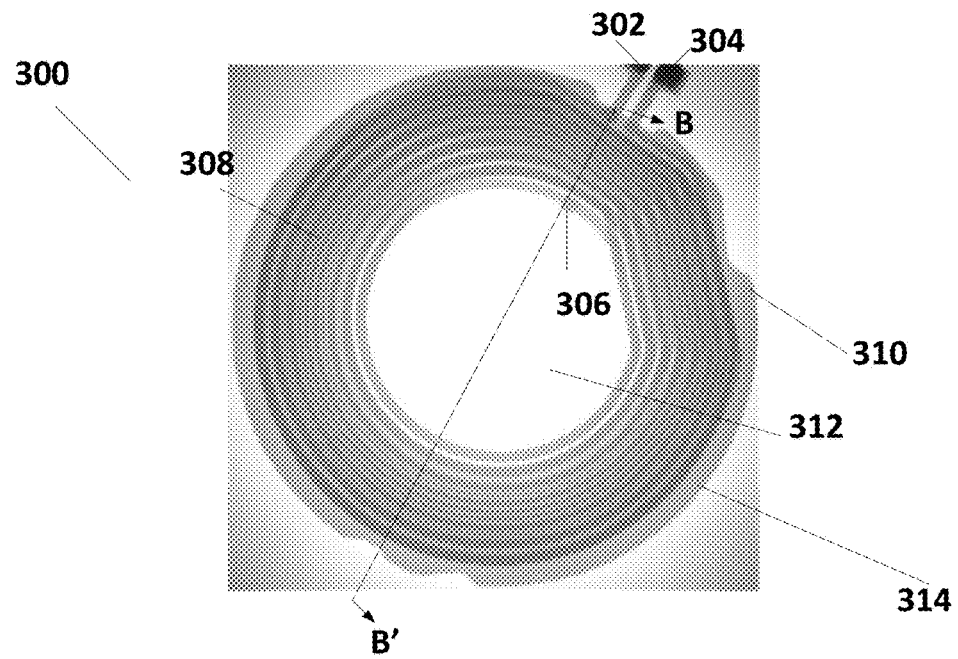
FIGS. 3A and 3B illustrate a series-coupled coil.
Figure 3B:
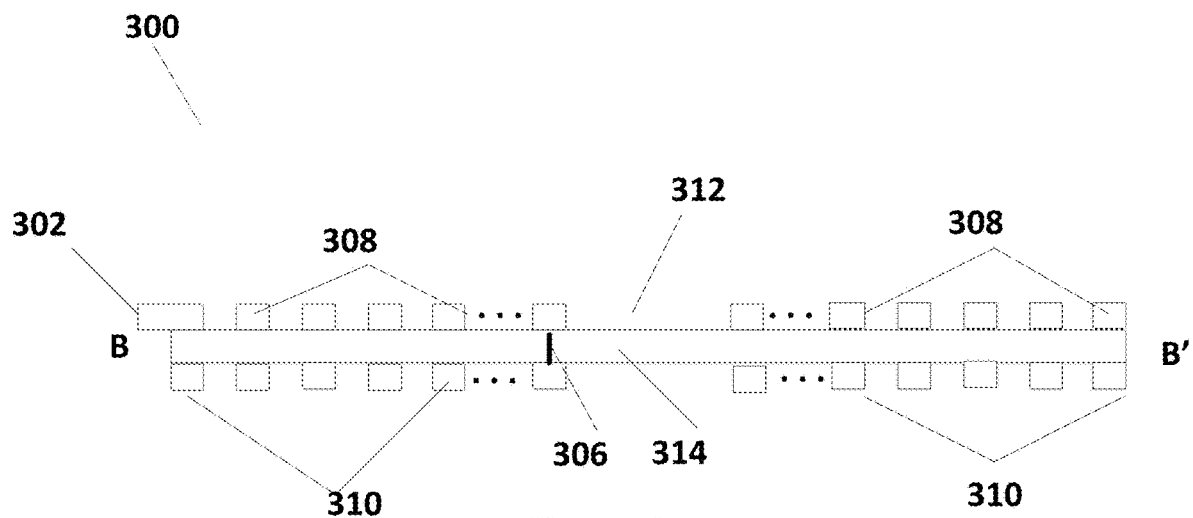

FIGS. 3A and 3B illustrates a coil structure 300 with a series connection between top and bottom layer coil traces. As illustrated, top layer coil 308 and bottom layer coil 310 are formed on opposite sides of a substrate 314. The coils spiral in from tap 302 at the top layer coil 308, connected to the bottom coil layer 310 through a via 306, and spiral out the bottom layer coil 312 to couple with tap 304. Top coil 308 and bottom coil 310 are wound around an opening 312. FIG. 3A illustrates a planar view of coil structure 300 while FIG. 3B illustrates a cross sectional view through the line B-B' in FIG. 3A.

FIGS. 3A and 3B illustrate coil structure with a high number of turns that are active. Consequently, magnetic coupling is higher. However, there is also a higher coil resistance because of the series connection, which results in a much longer length of coiled wire.

Some embodiments of coil structure according to the present invention include structures that can more efficiently operate as both a transmit coil and a receive coil, a TRx coil. Currently, solutions for coils currently available that can function efficiently as both a transmit (Tx) coil and a receive (Rx) coil are unknown. Conflicting geometric constraints on coils operating in a transmit mode and coils operating in a receive mode present design problems. When the TRx coil serves as a Tx coil, a small radius is desired so that the magnetic flux can be concentrated at the center area and well coupled to a receiver (usually a watch or another cell phone) Rx coil. When the TRx coil serves as a Rx coil, a large radius is desired so that the coil can pick up more magnetic flux. When a TRx coil is designed with small radius, a bad RX performance (low efficiency and bad space freedom performance) is caused because of low magnetic flux linked to it (or low mutual inductance in other words). When a TRx coil is designed with large radius, the bad Tx performance (low efficiency) is caused because of low magnetic flux it can generated at the center area that can be picked up by another Rx coil (or low mutual inductance in another words).

Additionally, when a TRx coil is designed with small inner radius and large outer radius, it is usually formed with too high a number of turns. This high number of turns causes several problems: 1) high coil resistance causing low efficiency; 2) inappropriate mutual inductance and self-inductance causing difficulty for tuning; and 3) too much coil area is used by the TRx coil so that other coils such as Near Field Communications (NFC) or Power Matters Alliance (PMA) are not compatible.

Some embodiments of the present invention can include a multiple-terminal coil where a TRx coil can include sections that are efficient for transmission and sections that are efficient for receiving. Transmit and receive coils can be separated within the multi-terminal coil. In a first design, a multiple terminal TRx coil is presented where the TX and RX coil sections are separated. This results in more design freedom for both the Tx coil section and the Rx coil section. Consequently, a TRx coil design can be provided where there can be good performance for the TRx coil acting in either the Tx mode or the Rx mode.

Figure 4A:
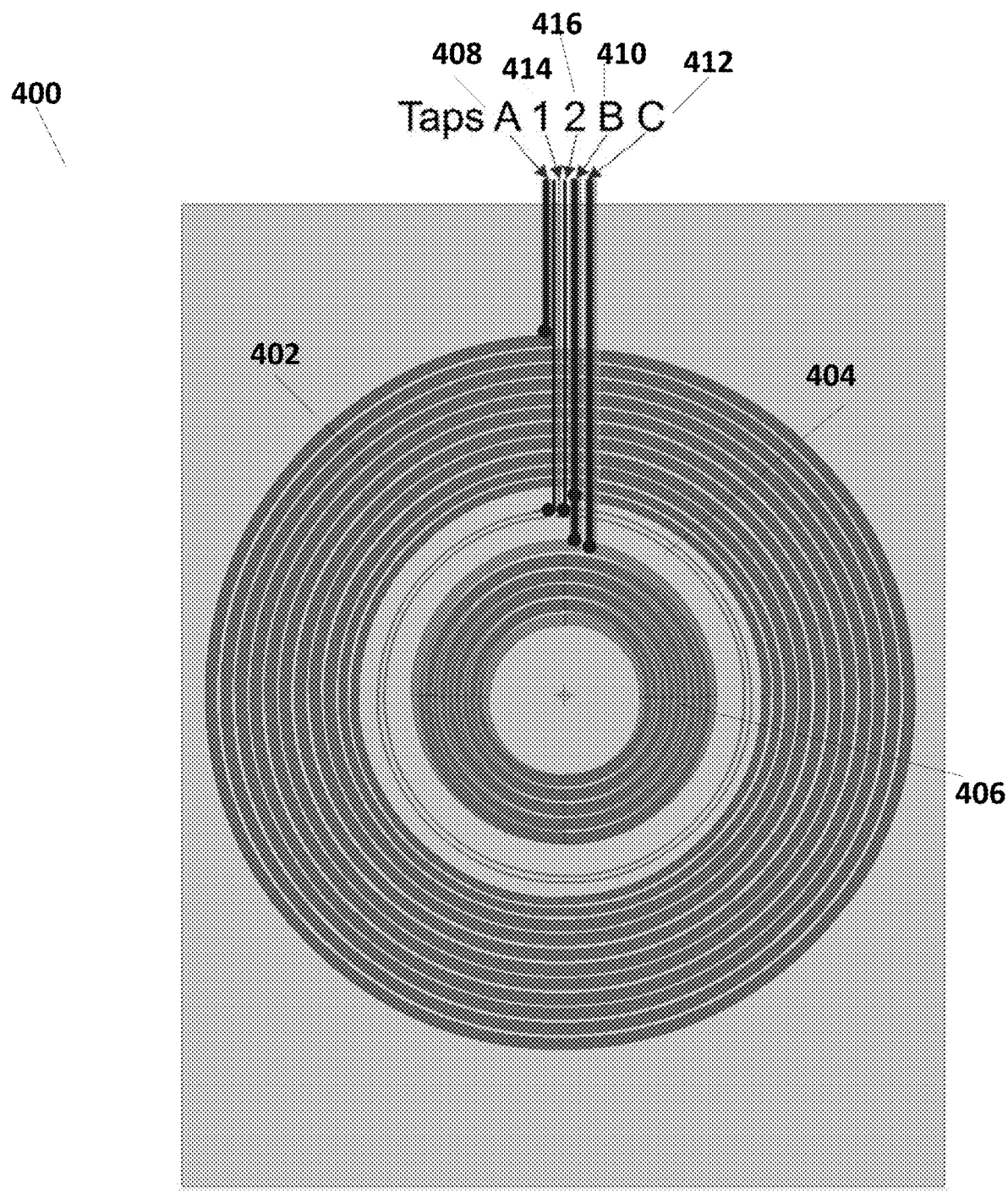
FIGS. 4A and 4B illustrate a multiple-terminal TRx coil according to some embodiments.

FIG. 4A illustrates a coil structure 400 with separated inner and outer coils. As illustrated in FIG. 4A, coil structure 400 includes an inner coil configuration 406 and an outer coil configuration 402. A third near-field coil (NFC) 404 can be placed in the space between inner coil configuration 406 and outer coil configuration 402. Inner coil 406, outer coil 402, and NFC coil 404 can be arranged on both sides of a substrate (PCB) structure. A tap A 408 is electrically coupled to one end of outer coil 402. A tap B 510 is coupled both to the opposite side of the spiraled outer coil 402 and to a first side of inner coil 406. A tap C 412 is coupled to the other side of inner coil 406. Consequently, an efficient transmit coil is formed through tap B 410 and tap C 412 and an efficient receive coil is formed through tap A 408 and tap B 410. NFC coil 404 can be coupled between a tap 1 414 and a tap 2 416. In some embodiments, inner coil 406 can be series coupled while outer coil 402 can be parallel coupled. In that fashion, inner coil 406 more efficiently transmits while the coil resistance in outer coil 402 used for receiving is kept at a lower level.

Figure 4B:
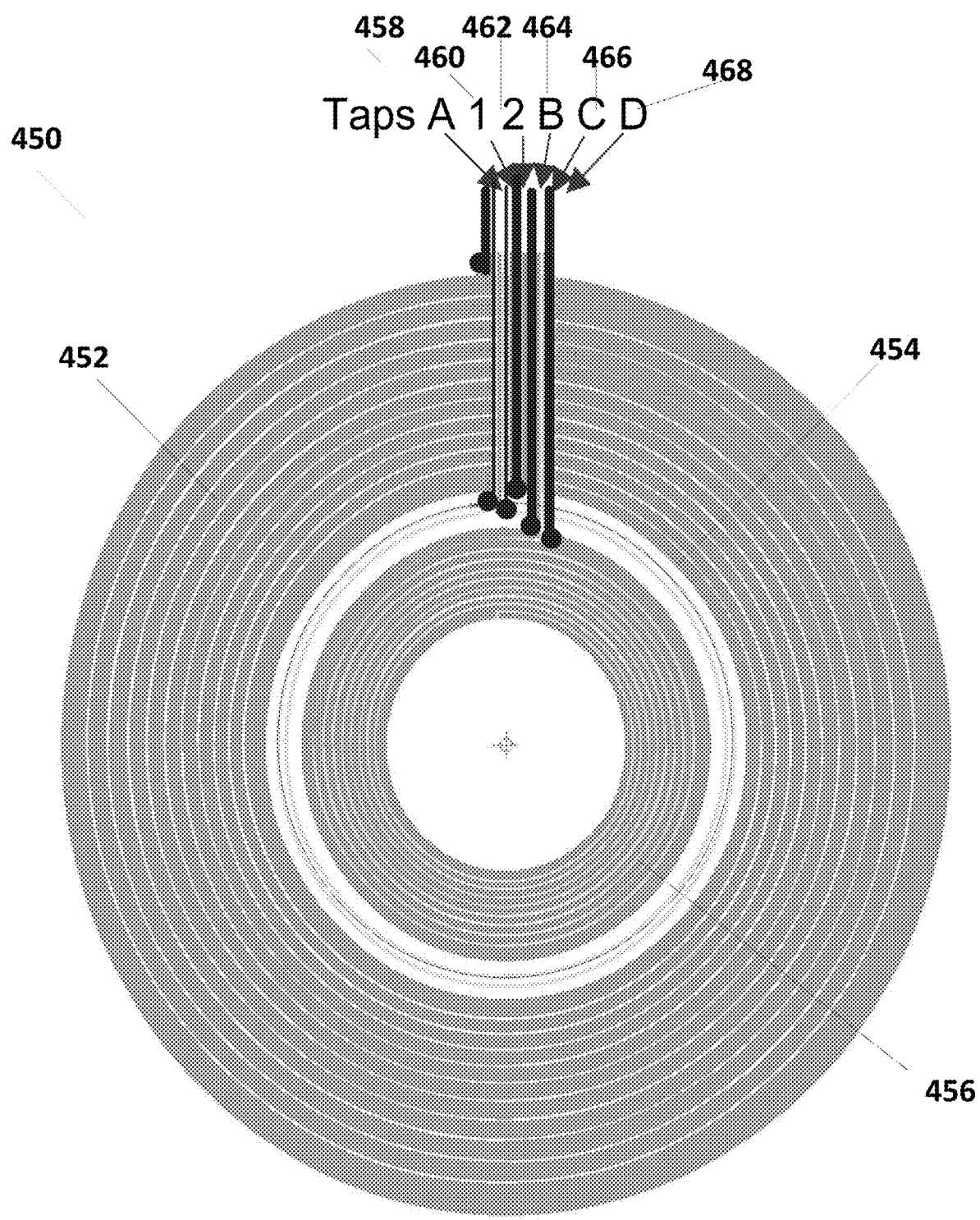

FIG. 4B illustrates another multi-tap coil arrangement 450 according to some embodiments. Coil arrangement 450 also includes an outer coil 452 and an inner coil 456. Again, a NFC coil 454 can be provided in the space between inner coil 456 and outer coil 452. As discussed above, inner coil 456, outer coil 452, and NFC coil 454 can be arranged on either side (top and bottom) of a substrate such as a PCB. As is illustrated in FIG. 4B, coil arrangement 450 includes a tap A 458 that is electrically coupled to a first side of outer coil 452 and a tap B 464 that is electrically coupled to the opposite side of outer coil 452. A tap C 466 is coupled to a first side of inner coil 456 and a tap D is coupled to the opposite side of inner coil 456. NFC coil 454 can be coupled between tap 1 460 and tap 2 462. A transmit coil is then formed by inner coil 456 coupled between tap C 466 and tap D 468 and a receive coil is formed by outer coil 452 coupled between tap A 458 and tap B 464. Again, inner coil 456 may be series coupled (i.e. the upper traces are coupled in series with the lower traces through a via) while the outer coil 452 is parallel coupled (i.e., each turn of the upper traces are coupled to the corresponding turn of the lower traces through vias).

As such, FIGS. 4A and 4B illustrate embodiments of multi-terminal TRx coil configurations 400 and 450, respectively. FIG. 4A illustrates an embodiment of a TRx coil 400 with three taps, tap A 408, tap B 410, and tap C 412. Coil 400 also includes tap 1 414 and tap 2 416 that are coupled to NFC coil 404 to form a near-field communication (NFC) system. With three terminals, tap A 408 and tap B 410, coupled to opposite ends of outer coil 402, can be used as receive coil and tap B 410 and tap C 412, coupled to opposite ends of inner coil 406, can be used as a transmit coil.

FIG. 4B illustrates a TRx coil 450 with four taps, tap A 458, tap B 464, tap C 466, and tap D 468. Again, NFC coil 454, which is coupled between tap 1 460 and tap 2 462, forms a NFC communications coil. As is shown, outer coil 452, which is coupled between tap A 458 and tap B 464, can be used for a Rx coil. Inner coil 456, which is coupled between tap C 466 and tap D 468, form a Tx coil. Other tap arrangements can be appropriately coupled to form Tx and Rx coils as well. For example, tap A 458 and tap C 466 can be coupled to outer coil 452 to form a Rx coil, and tap B 464 and tap D 468 can be coupled to inner coil 456 to form a Tx coil. The benefits of embodiments such as those illustrated in FIGS. 4A and 4B are that the transmit and receive coils are separated and therefore there is more design freedom for both the transmit coil and the receive coil. Consequently, there can be good performance for both the transmit coil and the receive coil, as each can be optimized for their respective functions.

Figure 5A:
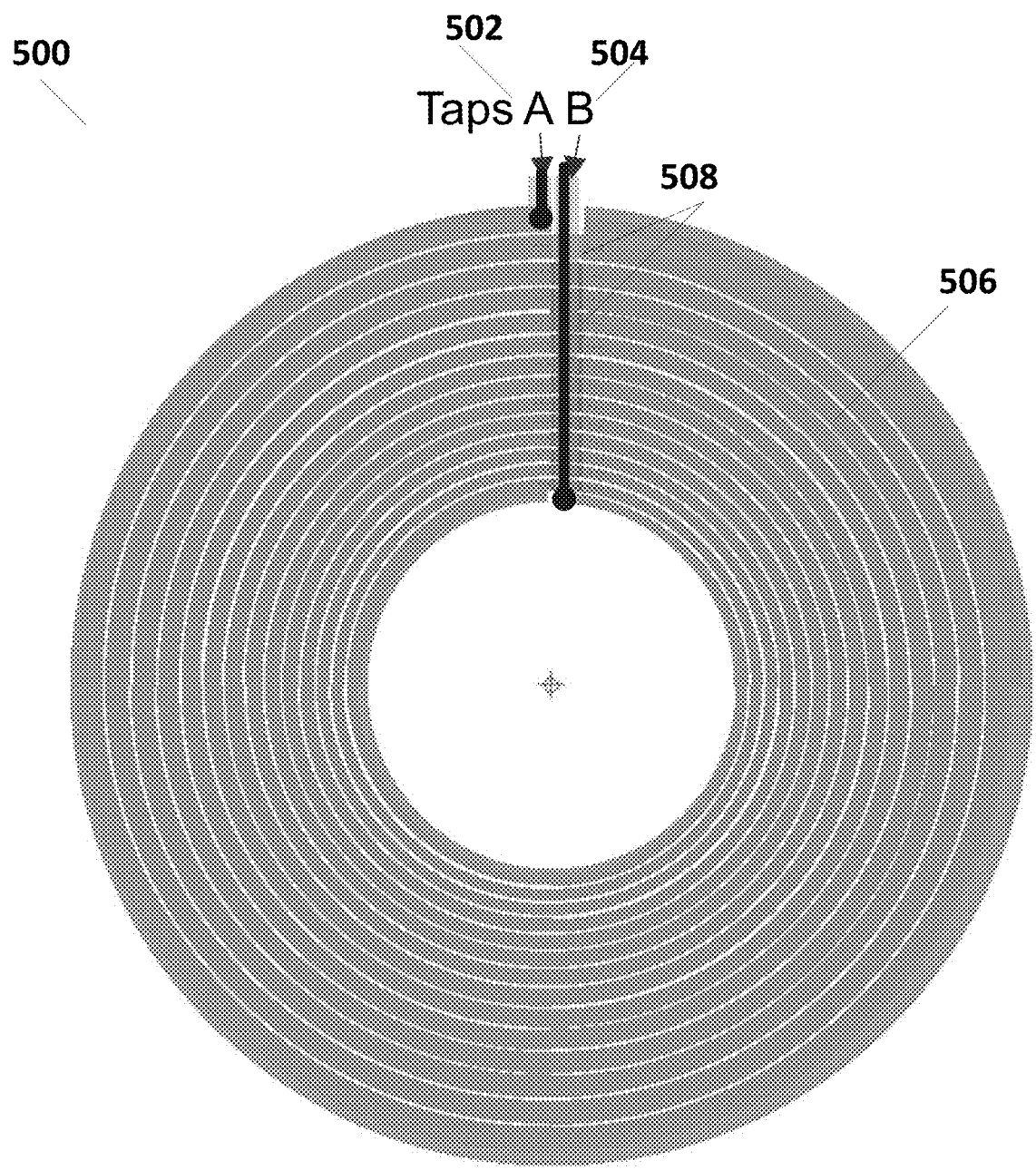
FIGS. 5A and 5B illustrate single coil embodiment of a TRx coil.
Figure 5B:
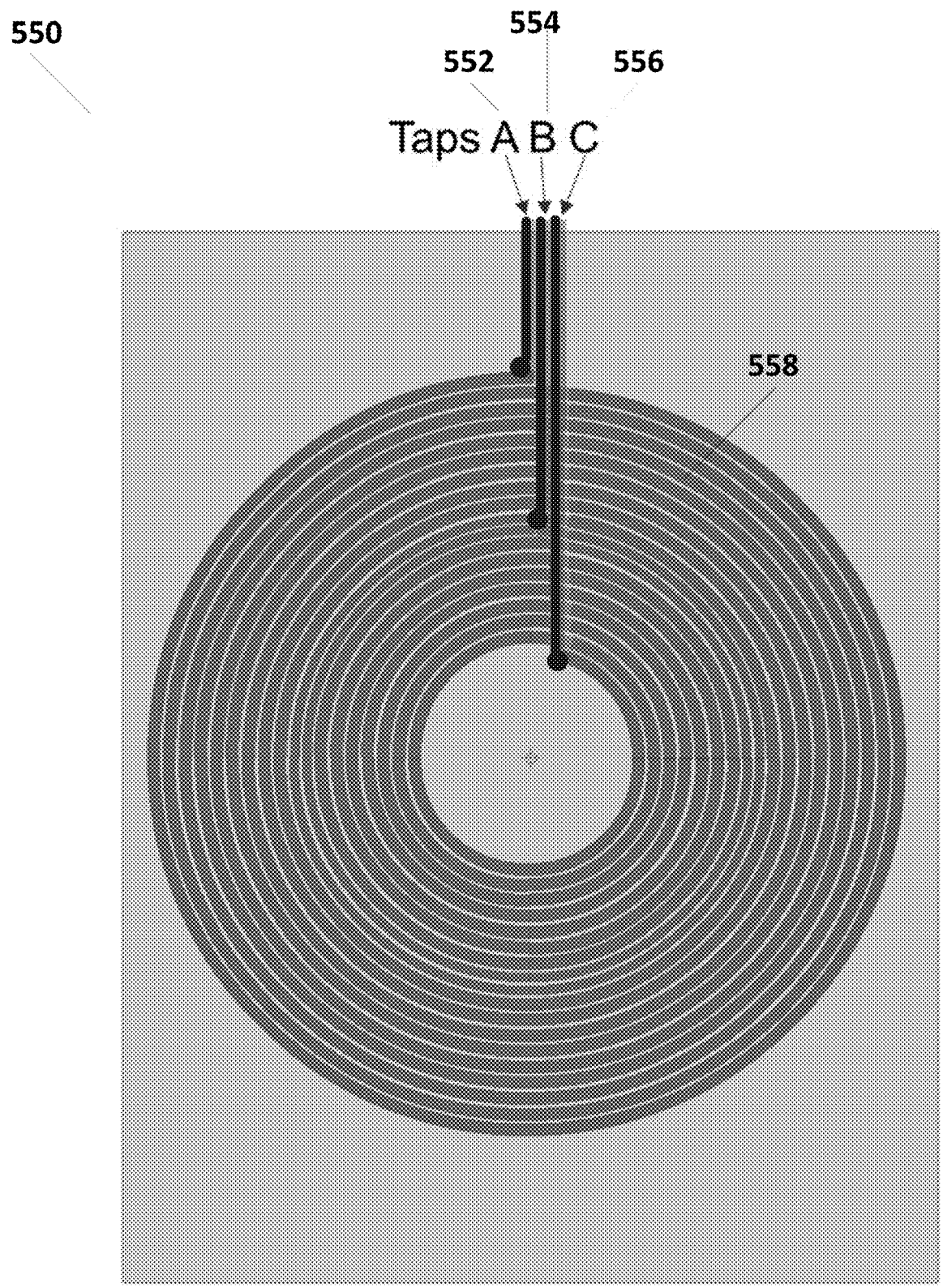

FIGS. 5A and 5B illustrate other coil configurations that can be used as a TRx coil. FIG. 5A illustrates a TRx coil configuration 500 that uses a single coil as a TRx coil. As illustrated in the example of FIG. 5A, TRx coil 500 includes two taps, tap 502 and 504, coupled to a single coil 506. In some embodiments, coil 506 include a top coil and a bottom coil formed on the top and bottom of a printed circuit board. As illustrated in FIG. 5A, the top coil and bottom coil are coupled in parallel with vias 508. The single coil 506 serves as both Tx coil and Rx coil, therefore the system requirement is highly reduced. In many examples, there is the same coil pattern on the top coil and the bottom coil. As illustrated in FIG. 5A, a two-terminal TRx coil, where tap A 502 and tap B 504 are coupled across the single coil 506, is used for both the Rx and the Tx coil. The benefit is that one coil serves as both Tx coil and Rx coil. The circuit requirement is highly reduced since only one driver is used and no switch is needed to switch coil configuration 500 between the Tx mode and the Rx mode. As is discussed further below, the geometries of traces that form individual turns of coil configuration 500 is adjusted between the inner and outer turns to address the competing demands between a Tx mode and a Rx mode. In particular, the outer traces are wider than the inner traces.

The benefit of coil arrangement 200 illustrated in FIG. 2A is that there is lower coil resistance because the top and bottom layer coils are coupled in parallel. However, the lowered number of turns available causes low magnetic coupling. In many such arrangements, the coil would have the same trace width at each winding turn. The need for a small inner radius to concentrate the magnetic flux at the center to improve Tx performance can result in bad Rx performance caused by low efficiency and small space freedom of the outer turns. As is discussed further below, configuration 500 exhibits differing trace widths at different turns to tune the performance of coil structure 500. Furthermore, as is further discussed below, coil structure 500 can provide further conducting material (e.g. copper) in normally unused portions of the coil layout in order to further reduce the coil resistance.

A TRx coil such as coil arrangement 500 can include trace widths at each winding that are optimized. The trace width at each turn can be optimized, for example, to improve the magnetic flux so that the mutual inductance can be improved to achieve better Tx performance. A thinner trace width can be included at the inner winding while wider trace width can be arraigned at the outer winding. In some embodiments, two or more individual trace widths for coil windings, used in a step fashion, can be used.

Such an arrangement can have several benefits, as is discussed further below. By such design, a larger inner radius and/or less numbers of turns are allowed, so that better Rx performance is achieved. By such design, proper self-inductance and mutual inductance can be achieved because another factor (ratio of outer turn trace width and inner turn trace width) is introduced. Proper system level tuning can be achieved by adjusting these parameters which can greatly simplify the system level (or circuit level) requirement. Additionally, by such design, smaller coil area is allowed, so that other coils such as NFC and/or PMA coils can be provided with the TRx coil. Arrangements with multi-width turns are further discussed below with respect to FIGS. 8A, 8B, 8C, 11, and 12, for example.

FIG. 5B illustrates another embodiment using a single continuous coil TRx coil 550. TRx coil 550 includes a coil 558 that is coupled to three taps: tap A 552, tap B 554, and tap C 556. Tap A 552 is coupled to the outermost turn of coil 558 while tap C 556 is coupled to the innermost turn of coil 558. Tap B 554 is coupled to an intermediate turn of coil 558. Consequently, a transmit coil can be formed between tap B 554 and tap C 556 while a receive coil can be formed between tap A 552 and tap B 554. As illustrated previously, connections to taps are illustrated by solid lines and dots.

Figure 6A:
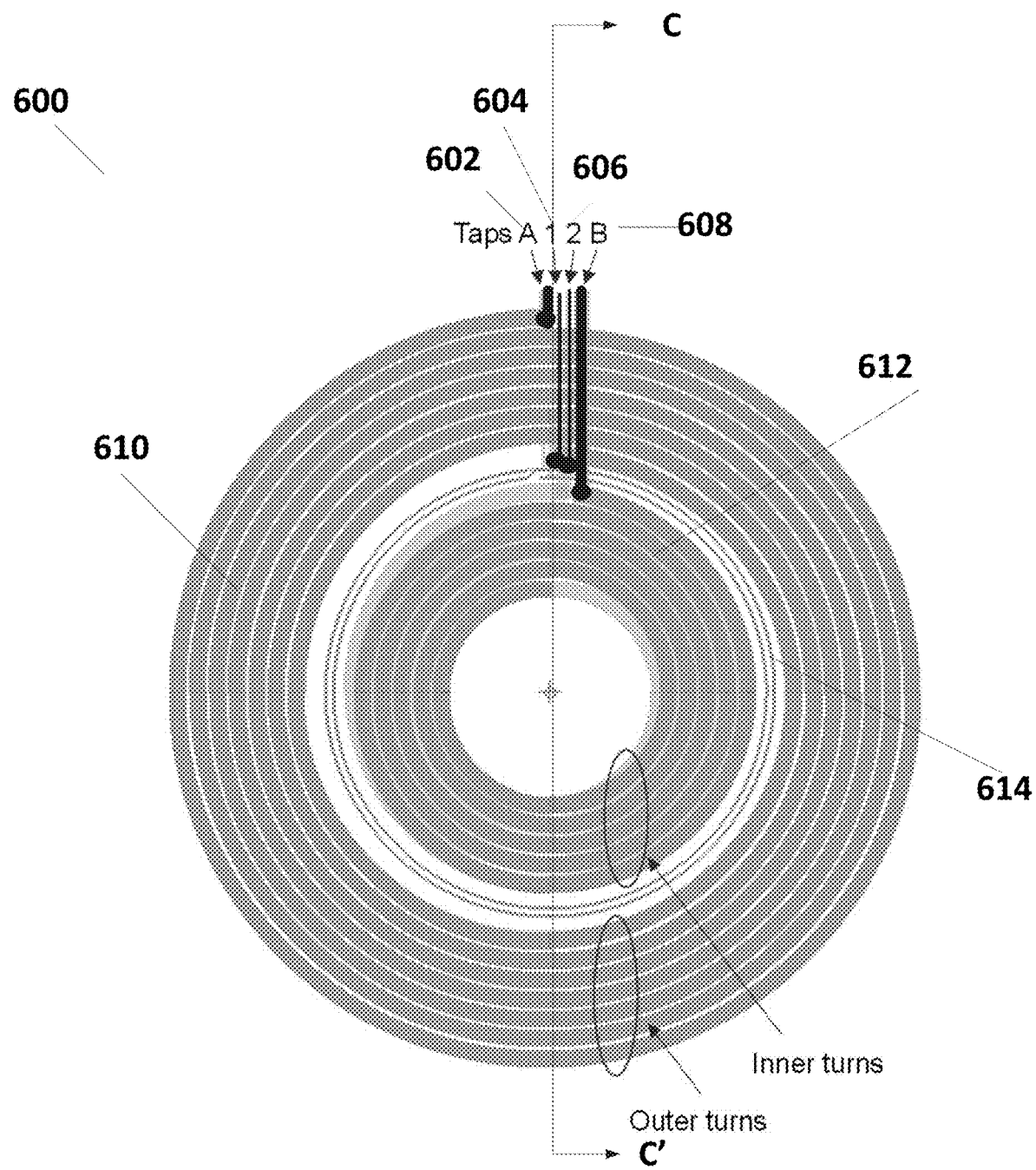
FIGS. 6A and 6B illustrate another multiple-terminal TRX coil according to some embodiments.
Figure 6B:
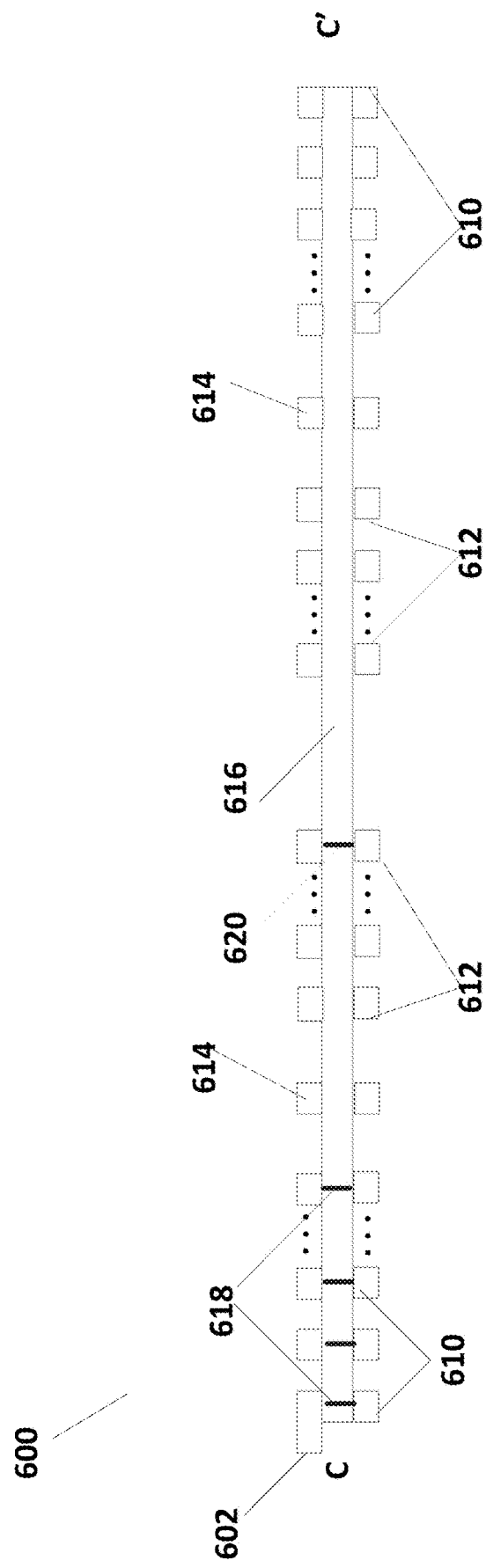

FIGS. 6A and 6B illustrates another embodiment of a two-tap coil configuration 600 according to some embodiments. As illustrated in FIG. 6A and in FIG. 6B, coil configuration 600 includes an outer coil 610, an inner coil 612, and a NFC coil 614 located in the space between outer coil 610 and inner coil 612 and coupled to tap 1 604 and 2 606. As is further illustrated in FIG. 6A, a tap A 602 is coupled to one side of outer coil 610. The other side of outer coil 610 is coupled to one side of inner coil 612 and tap B 608 is coupled to the other side of inner coil 612. FIG. 6B illustrates a cross section of coil configuration 600 along the line C-C', illustrating formation of the coils on opposite sides of a substrate 616. The connections are re-arranged connections of Outer Turns in outer coil 610 and Inner Turns of inner coil 612. As further illustrated in FIG. 6B, a parallel connection of top and bottom layer coils in outer coil 610 is formed through vias 618. Additionally, a series connection of top and bottom layer coils for inner turns 612 is formed with via 620. Optimized coil resistance, which improves the Tx and Rx performance, can be obtained through the parallel and series connection to top and bottom coils. Furthermore, concentrated magnetic flux generated at the Tx coil improves the magnetic coupling. The large outer turns coil 610 pick up more magnetic flux operating as a Rx coil, which improves the Rx performance.

Series connection of top and bottom layer coils for inner turns of inner coil 612 can be used for a Tx coil. Inner turns are for Tx coil performance, which generates concentrated magnetic flux. The diameters of the turns are small and the series connection between upper coils of inner coil 612 and bottom coil of inner coil 612 allows more turns to yield higher magnetic fields. Higher magnetic coupling to the Rx coils due to series connection (more turns are allowed) is important for Tx performance.

The parallel connection of top and bottom layer turns for outer turns of outer coil 610 allows for lower resistance in outer coil 610. Larger outer turns, with lower resistance, improves the receipt of magnetic flux from a corresponding Tx coil. The optimized coil resistance in both inner turns and the outer turns improves the Tx and Rx performance.

Concentrated magnetic flux generated as TX coil, which improves the magnetic coupling. Allows large outer turns, which picks up more magnetic flux, to function as the RX coil, which improves the RX performance.

Consequently, some embodiments include a multiple terminal TRx coil. Tx and Rx portions of the coil structure are separated, therefore there is more design freedom for both Tx coil and Rx coil functionality. This results in good performance for both the Tx coil and the Rx coil. Some embodiments may include a two terminal TRx coil. One coil serves as both the Tx coil and the Rx coil, highly reducing the system requirements. In some embodiments, the connection between outer turns and inner turns is rearranged. Parallel connection of top and bottom layer coils for outer turns results in an optimized Rx coil. Series connection of top and bottom layer coils for inner turns results in an optimized Tx coil. Optimized coil resistance that can result by varying the widths of the traces between outer turns and inner turns improves the Tx and Rx performance. Concentrated magnetic flux generated as Tx coil formed by the higher number of inner turns improves the magnetic coupling. Large outer turns with greater trace widths picks up more magnetic flux as Rx coil, which improves the Rx performance.

As illustrated above, in many systems multi-tap coils can be used to form a TRx coil. This is illustrated in, for example, TRx coil 400 in FIG. 4A, TRx coil 450 illustrated in FIG. 4B, or TRx coil 600 illustrated in FIG. 6A. These can be illustrated in various other coils as well. In these configurations, switching network 158 (FIG. 1B) is complex enough to select one of the coil configurations by switching between taps according to the mode from mode controller 156.

In some cases, hybrid coils are designed where one coil drives both the transmit and receive systems, as is illustrated for example by TRx coil 550 illustrated in FIG. 5B. However, optimization of coils in both the TX system and the RX systems is important to achieving efficient systems. One particular parameter that affects the operation of the performance of both TX coils and RX coils is the coil resistance. Increased coil resistance leads to increased power loss due to heating of the coils during both transmission and receipt of power. Both AC coil resistance (ACR) and DC coil resistance (DCR) can be used to characterize this operational parameter.

In particular, Tx and Rx coils transfer power in the wireless power systems. The coils also play important role for the thermal performance of devices in which they are placed. At both the transmitter and the receiver, the coil current can be 1-2 A or greater, which generates heat in the transmit and receive coils according to their resistances. The Rx coils, which are typically coupled to and are proximate to the battery, are put in close proximity to the Tx coil when power is being transferred, for example in order to charge the battery. Therefore, the heat from the coils can be easily transferred to the battery and affect the charging performance and battery performance, e.g., limiting the charge current and power level, and the lifetime of the battery. It is therefore important to control the heat from the coils. Additionally, power lost in heating reduces the efficiency of wireless transfer between a transmitting device and a receiving device.

Figure 7A:
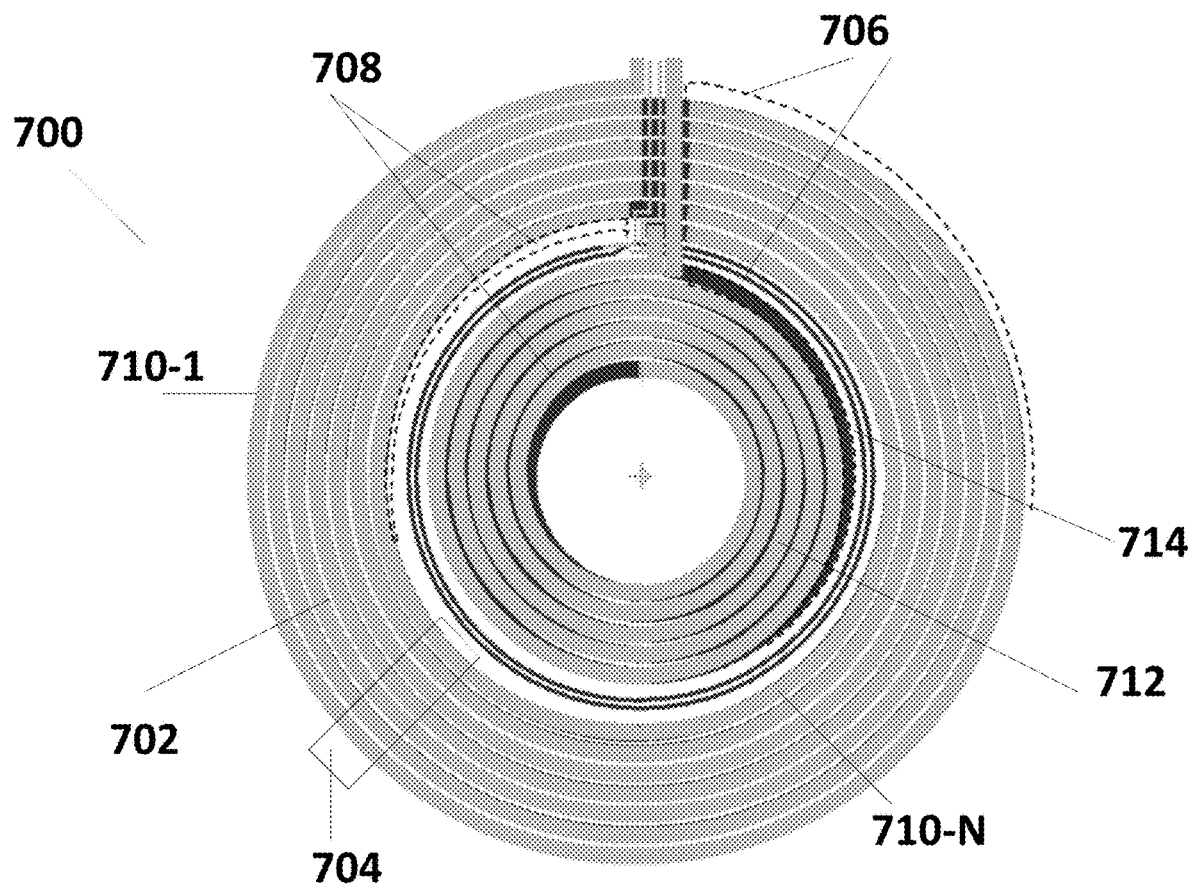
FIGS. 7A and 7B illustrate a coil construction.
Figure 7B:

FIGS. 7A and 7B illustrate a coil structure 700 with outer coils 702 having turns 710-1 through 710-N, where turn 710-1 is the outermost coil and turn 710-N is the innermost of N turns. Coil structure 700 also includes an inner coil 712 and possible a NFC coil 714. FIG. 7B illustrates a cross section 704 of turns 710-1 through 710-N. As is illustrated in FIG. 7B, coil turns 710-1 through 710-N all have the same trace width at each winding turn, causing high resistance at outer turns due to their higher diameter. As is further shown in FIG. 7A, the coil is arranged with inner and outer winding turns 710-1 through 710-N. This results in wasted area 706 at outer turn 710-1 and wasted space 708 at inner turn 710-N. Consequently, there is wasted copper area between the inner and outer winding that can be used to decrease the coil resistance in coil 702.

As illustrated in FIGS. 7A and 7B, the typical coil design has the same trace width for each winding. Although coil design 700 can be used as a TRx coil, the trace width is not optimized to improve performance. For example, the outer turn, turn 710-1, is longer and thus has a higher resistance generated in that turn. Another typical coil design is to use spiral shape of the winding, even for the inner and outer coils, as is illustrated in FIG. 7A. This design wastes area that can be used to provide more conductor and generates higher resistance than can otherwise be attained. Further, the need for small inner radius to concentrate the magnetic flux at the center to improve transmit coil performance, which results in bad receiver performance and results in low efficiency and a small space freedom.

In accordance with some embodiments of the present invention, the trace width at each winding turn of the coil is varied to optimize coil performance. The trace width at each turn can be optimized to improve the resistance and the magnetic flux so that the mutual inductance can be improved to achieve better transmitter performance. A thinner trace width can be provided at the inner windings while wider trace width can be arranged at the outer windings. In some embodiments, two or multiple different trace widths for coil windings can be used from inner windings to outer windings. In some embodiments, the trace width can continuously vary between the inner coils and the outer coils, while in some embodiments, the trace width can be a step function as it is varied between the inner coil and the outer coil. Such a coil design is demonstrated by coil structure 800 illustrated in FIGS. 8A, 8B, and 8C. Such an arrangement can have several benefits. By such design, larger inner radius and/or less number of turns are allowed for the portion of coil structure 800 involved in Tx mode, so that better Rx performance is achieved.

This is in contrast to coil structures such as structure 700 illustrated in FIGS. 7A and 7B and also conventional structure 200 illustrated in FIGS. 2A and 2B. As previously discussed, FIGS. 2A and 2B illustrates a parallel connection of top layer coil 208 and bottom layer coil 210, however these coils are single width traces. As previously discussed, top layer coil 208 and bottom layer coil 210 refer to coils formed on the top and bottom layers of a substrate, for example a printed circuit board. There is the same coil pattern on the top and bottom layer. Vias 206 are used to connect the top layer coil 208 and bottom layer coil 210. The benefit of this arrangement is that there is lower coil resistance because the top layer coil 208 and bottom layer coil 210 are coupled in parallel. However, the lowered number of turns available causes low magnetic coupling.

As is illustrated in FIG. 2A, coil structure 200 has the same trace width at each winding, as is further illustrated by coil structure 700 in FIGS. 7A and 7B (which illustrates both an inner coil and outer coil structure). The need for a small inner radius to concentrate the magnetic flux at the center to improve Tx performance provides for a bad Rx performance caused by low efficiency and small space freedom.

In some embodiments of the present invention, coils have turn traces with optimized trace widths to minimize the resistance, and therefore decreases the heat generated, increases the efficiency of power transfer, and improves both transmit and receive performance. By such design, proper self-inductance and mutual inductance can be achieved because another factor (ratio of outer turn trace width and inner turn trace width) is introduced, so that proper system level tuning can be achieved which can greatly simplify the system level (or circuit level) requirement. Additionally, by such design, smaller coil area is allowed, so that other coils such as NFC and/or PMA can become compatible.

Embodiments of the present invention optimize trace width at each winding. In some embodiments, turns are optimized to decrease resistance (DCR/ACR). In some embodiments, a 10% DCR reduction can be achieved. In some embodiments, the outer winding has a wider width. In this way, the coil resistance is reduced. Furthermore, in some embodiments the circular shape of the winding traces is used for the inner and outer turns. The extra copper area is utilized to further reduce the coil resistance. Circular edges reduce DCR. In some embodiments, a 1-2% decrease in DCR can be achieved by circular edges.

Figure 8A:
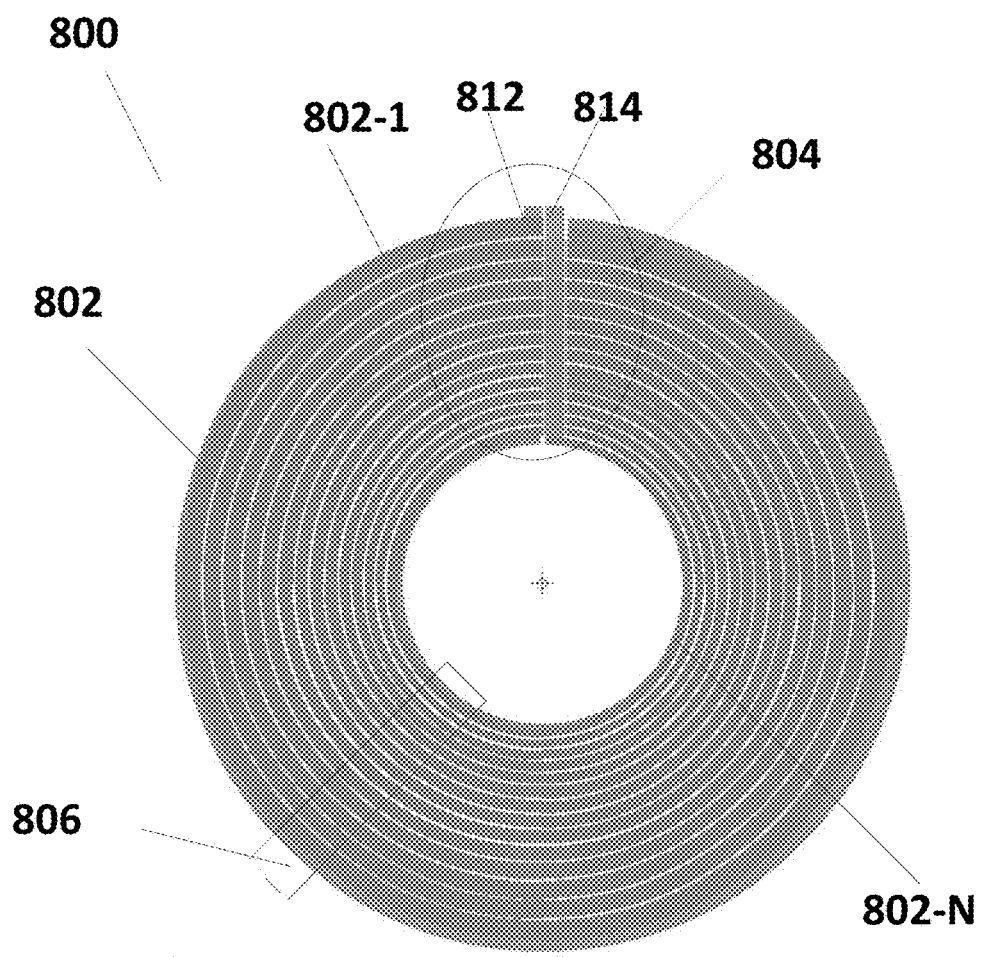
FIGS. 8A, 8B, and 8C illustrates a coil segment according to some embodiments with a variation of coil widths from inner coil turns to outer coil turns to decrease coil resistance and utilize unused portions.
Figure 8B:
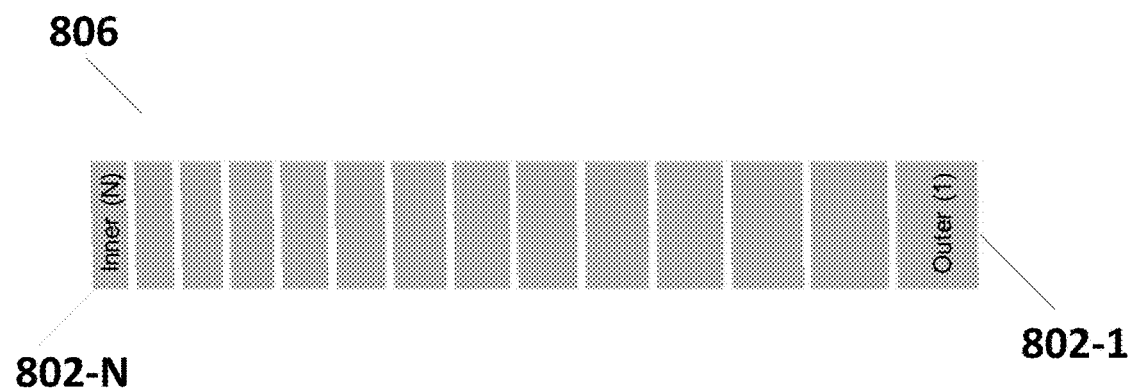
Figure 8C:
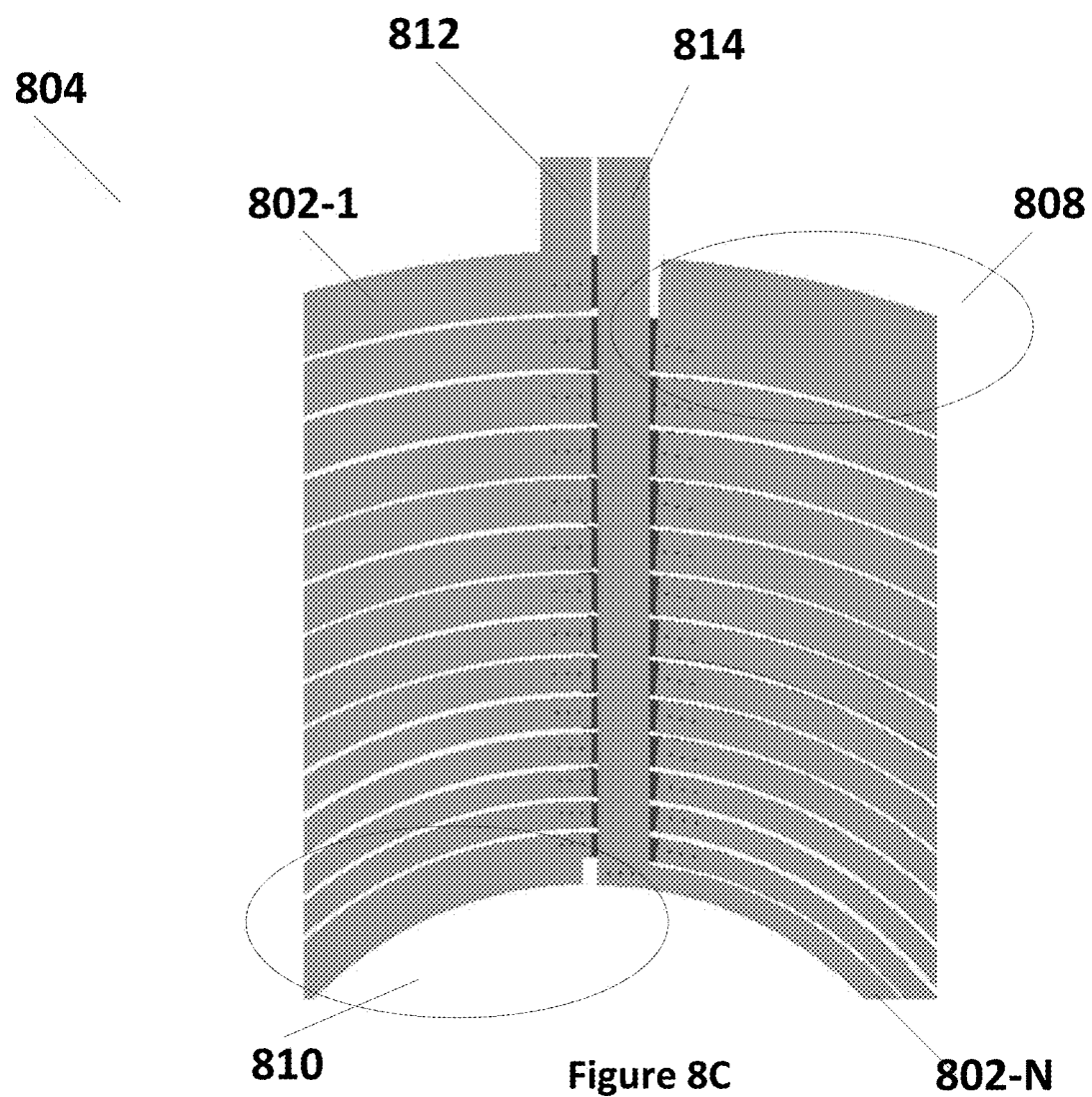

Performance can be improved by arranging the coil design to improve mutual inductance. An example of this is illustrated in FIGS. 8A, 8B, and 8C. As illustrated by coil arrangement 800, which may represent parallel or series connected coils coupled between taps 812 and 814. In coil arrangement 800, the trace width can be optimized at each winding turn. In particular, there are thinner trace widths at the inner windings and wider trace widths at the outer winding. This results in several benefits as discussed above.

FIG. 8A illustrates a coil structure 800 according to some embodiments of the present invention. FIG. 8B illustrates a cross section 806 of outer coil 802. As is illustrated in FIG. 8B, outer coil 802 includes traces 802-1 through 802-N, where trace 802-1 illustrates the outer-most trace of coil 802 while trace 802-N illustrates the innermost trace of outer coil 802. As is illustrated in FIG. 8B, traces 802-1 through 802-N in coil 802 are width optimized for reduction of resistance (DCR). As is illustrated in the example of FIG. 8B, trace width is thicker on outside traces rather than inside traces (i.e. trace 802-1 is has a width greater than that of trace 802-N). FIG. 8B illustrates trace width from inside trace 802-N to outside trace 802-1 of cross section 806. The trace width can be optimized at each winding trace 802-1 through 802-N.

With thinner trace widths at the inner windings (e.g. traces close to trace 802-N), more turns are allowed at the inner windings, which concentrates the magnetic flux at the center for functioning as a TX coil. Further, the mutual inductance is improved. With concentrated magnetic flux, less number of turns are required compared with the traditional design so that N can be smaller, which reduces the coil resistance and improves the efficiency. With concentrated magnetic flux, a larger inner radius (i.e. the radius determined by inner trace 802-N) is allowed, which improves the RX performance (higher efficiency and larger space freedom) and provides compatibility for other coils (NFC and PMA). Proper self-inductance and mutual inductance can be achieved because another factor (ratio of outer turn trace width and inner turn trace width) is introduced. This provides that proper system level tuning of coil system 800 can be achieved, which can greatly simplify the system level (or circuit level) requirement.

Although FIG. 8B illustrates an example where the trace width varies at each trace 802-1 through 802-N, the trace width may vary smoothly throughout the windings of coil trace 802 or there may be a step-wise variation of trace widths. For example, in some embodiments there can be a small number (e.g. two or more) trace widths for distributed among coil winding traces 802-1 through 802-N. As discussed above, different trace widths can be used for each coil winding trace 802-1 through 802-N, which may be difficult for coil design. In some embodiments, a simplified design can be used. Two or more trace widths for the coil windings can be used. One or several smaller widths can be used for the inner windings, which set the mutual inductance between RX coil as a TX coil. One or several larger widths can be used for the outer windings which set the mutual inductance between TX coil as an RX coil. In some embodiments, for example, traces 802-1 through 802-L have a first width while traces 802-(L+1) through 802-N have a second, smaller, width.

Consequently, as illustrated in FIGS. 8A and 8B, the trace width can be optimized at each winding. There is a thinner trace width at the inner winding and a wider trace width at the outer winding. With the thinner trace width at the inner winding, more turns are allowed at the inner side, which concentrates the magnetic flux at the center as TX coil. The mutual inductance is improved. The method can be also simplified with two or more trace widths. One or more smaller trace widths for inner windings and one or more larger trace widths for outer windings.

FIG. 8C illustrates a zoom-in 804 of outer coil 802. Furthermore, circular outer and inner edges, as is illustrated in section 104 and shown in FIG. 2C, allows for more efficient use of space and more copper area. As is illustrated in FIG. 8C, varying coil widths can be used to optimized coil resistance (ACR). FIG. 8C illustrates a cross section 804 of coil 802, in particular coil traces 802-1 through 802-N. Coil 802 can be any of the coils discussed above, not just that illustrated in FIG. 8A. FIG. 8C can represent a sectional area 804 of any coil, whether they be included in multi-coil structures or single-coil structures.

As illustrated again in FIG. 8C, and discussed above with respect to FIG. 8B, the widths of coil traces 802-1 through 802-N varies so that outer coils (802-1) have a wider width than inner coils (802-N). As is illustrated in FIG. 8C, the width of the innermost coil trace 802-N is narrower than that of the outermost coil trace 802-1. Widths of intermediate coil traces (802-2 through 802-(N−1)) increase towards the outside trace 802-1. A consequence of this structure is that the resistance of outer loops 802-1, which have longer lengths, is decreased from that which would result when all of the traces have the same width. Further, the space occupied by coil 802 is not increased significantly. As discussed above, coil traces of varying widths as illustrated in FIG. 8C can be used to form any of the coil structures previously discussed in FIGS. 4A, 4B, 5A, 5B, 6A, and 6B.

In order to further reduce the resistance of a coil 802, un-used areas outside of the spiral of the coil traces 802-1 through 802-N, illustrated as wasted areas 706 and 708 in FIG. 7A, can be used to increase coil widths even further in those areas. FIG. 8C illustrates a coil 802 with coil traces 802-1 through 802-N, as discussed above, with widths of each coil trace 801-1 through 802-N varying from narrow for inner loops and wider for outer loops (e.g., coil loop 802-1 is wider than coil loop 802-N). However, as illustrated in FIG. 8C, in region 808, the width of coil loop 802-1 as it transistors to coil loop 802-2 is widened further to fill the area out to the outside of coil loop 802-1 to form, for example, a circular region for coil 802 itself. Similarly, as shown in region 810, the innermost coils (802-(N−1)) can be filled out to the inner diameter of coil loop 802-N to similarly fill out a circular region.

FIG. 8C illustrates coil designs according to some embodiments of the present invention. These areas of increased conductor width can further reduce the resistance of the inner-most and the outer-most turns. This also allows the remaining turns (coil turns 802-1 through 802-N) to be re-optimized for even lower resistive characteristics. Although regions 808 and 810 are illustrated as filling out circular regions (e.g., region 808 fills out to a circle with outer diameter matching turn 802-1), any shape can be formed. For example, region 808 can fill out a shell of any shape, including squares or other shapes.

Consequently, some embodiments of the present invention include TRx coils with optimized trace widths at each winding. The trace width at each turn is optimized to improve the magnetic flux so that the mutual inductance and coil resistance can be improved to achieve better TX performance. Thinner trace widths can be used at the inner winding and wider trace widths can be used at the outer winding. In some embodiments, the trace widths can be step-wise varied between the inner winding traces and the outer winding traces. In some embodiments, two or more trace widths can be used in the coil windings. This results in various benefits. By such design, larger inner radius and/or less number of turns are allowed, so that better RX performance is achieved. By such design, proper self-inductance and mutual inductance can be achieved because another factor (ratio of outer turn trace width and inner turn trace width) is introduced, so that proper system level tuning can be achieved which can greatly simplify the system level (or circuit level) requirement. By such design, smaller coil area is allowed, so that other coils such as NFC and/or PMA are compatible.

Consequently, some embodiments of coils optimize trace width at each winding. In some embodiments, the trace width at each turn is optimized for resistance and for receipt of wireless power. Furthermore, in some embodiments circular inner and outer windings to reduce resistance while increasing coil coverage. In some embodiments, the winding widths can be redistributed based on target geometries for either the transmit coil or the receive coil. However, in some cases these arrangements compromise the resistance of the coil. Typically, 14 turns are spaced from R=21.05 mm to R=8 mm, for example. However, the coil can be segmented to optimize winding width within each segment.

In some systems, a finger design is used in a coil structure to reduce the skin effect and to decrease resistance of the coil. Coils using a finger design are increasingly used in the coil structures of wireless charging application. Finger designs reduce the skin effect and decrease coil resistance. FIG. 9A illustrates a coil structure 900 that includes fingers. As illustrated in FIG. 9A, coil 900 includes spiral traces 902 where a tap 904 is coupled to outer trace 908-1 and a tap 906 is coupled to inner trace 908-N. As is further illustrated in FIG. 9A, coil traces 902 are formed on a substrate 914, which may be a printed-circuit board.

FIG. 9B illustrates a planar view of section 912 illustrated in FIG. 9A. As is illustrated in FIG. 9B, coil structure 900 is a two-tap coil having taps 904 and 906. Each of taps 904 and 906 is coupled to a trace with multiple fingers. As illustrated in FIG. 9B, tap 904 is coupled to fingers 916-1 through 916-$m$ and tap 906 is coupled to fingers 918-1 through 918-$m$. In this example, m is four meaning there are four fingers, in each coil, although m can have any value. As discussed above, fingers 916-1 through 916-$m$ are coupled to trace 908-1 so that trace 908-1 includes m traces 916-1 through 916-m. Additionally, fingers 918-1 through 918-m are coupled to trace 908-N so that trace 908-m includes m traces 918-1 through 918-m.

FIG. 9C illustrates a planer view of section 910 shown in FIG. 9A. As is illustrated in FIG. 9C, each of traces 901-1 through 908-N includes m fingers. Trace 908-1 is illustrated with fingers 916-1 through 916-m. Trace 908-N is illustrated with fingers 918-1 through 918-m. As should be realized, fingers 916-1 through 916-m becomes fingers 918-1 through 918-m as coil traces 902 transition from outer trace 908-1 to inner trace 908-N. In the example illustrated in FIG. 9C, as in FIG. 9B, m is 4.

As discussed above, the structure of coil design 900 results in better coil resistance due to the reduction of the skin effect. However, in coil structure 900 each turn 908-1 through 908-N includes the same number of fingers m and each finger 916-1 through 916-m (which become 918-1 through 918-m) has the same width. Consequently, coil structure 900 is not an optimized design.

Embodiments of the present invention vary one or more of the number of fingers in each turn and the finger width in the turns of the coil in order to further optimize coil resistance. Consequently, some embodiments of the present invention provide for coil resistance optimization in each finger and in each turn.

Figure 10A:
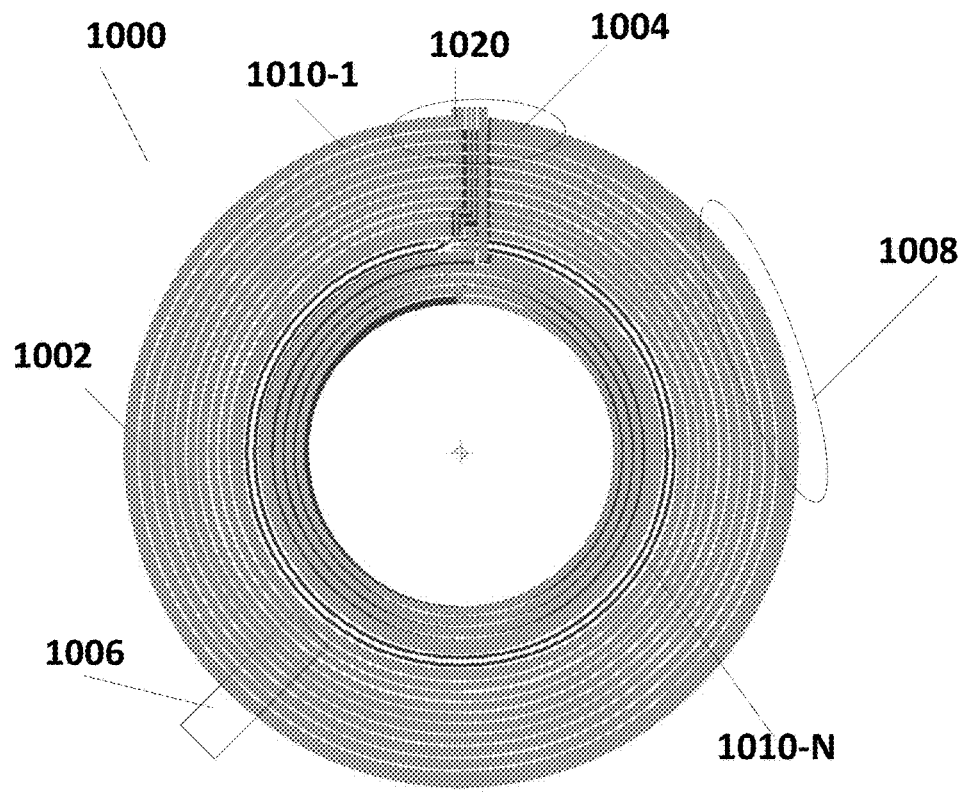
FIGS. 10A, 10B, 10C and 10D illustrate a coil structure with fingers according to some embodiments of the present invention.

FIGS. 10A, 10B, 10C and 10D illustrates a coil design 1000 that is optimized with fingers according to some embodiments of the present invention. As is illustrated in FIG. 10A, coil 1000 includes coil turns 1002 ranging from outer turn 1010-1 to inner turn 1010-N. As is illustrated, a tab 1020 is coupled to outer turn 1010-1. Similar to that shown in FIGS. 8A, 8B, and 8C, the overall width of turns 1010-1 through 1010-N can vary by turn so that outer turns have a width greater than that of inner turns. Each of turns 1010-1 through 1010-N are formed of individual fingers. The width of the individual fingers can be varied by turn and, in some embodiments, the number of fingers in each turn can vary. Furthermore, the unused spaces can be filled with additional fingers to fill coil 1000 out. These structures are further illustrated in FIGS. 10B, 10C, and 10D. Consequently, the number of fingers and the width of the fingers can be varied by turn in order to optimize coil resistance of coil design 1000.

Figure 10C:
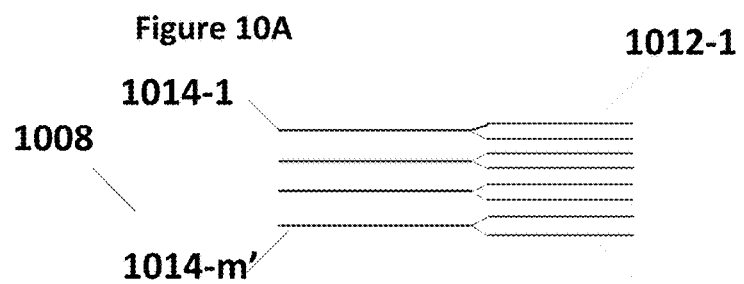
Figure 10B:
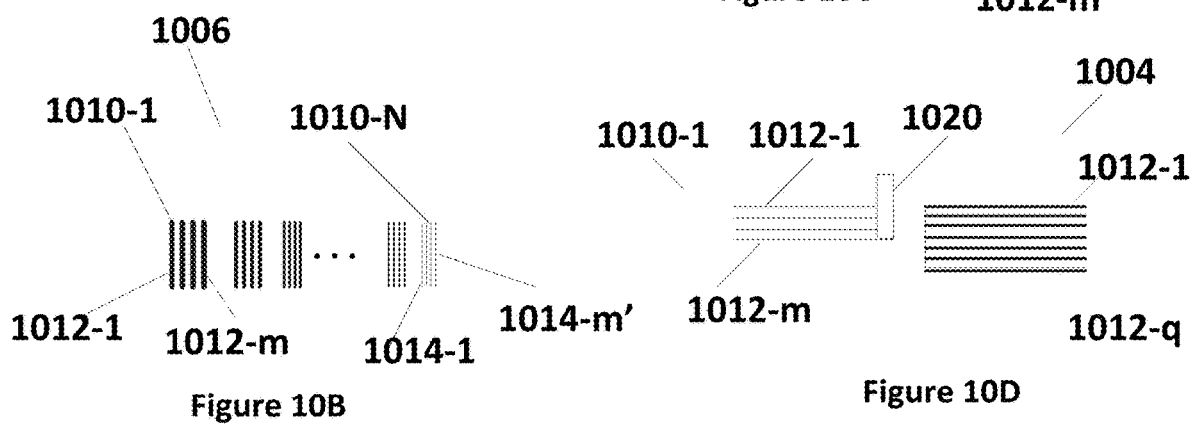

FIG. 10B illustrates a planar view of section 1006 of coil traces 1002. As is illustrated FIG. 10B, outer trace 1010-1 has fingers 1012-1 through 1012-m while inner trace has fingers 1014-1 through 1014-m'. As is illustrated in FIG. 10B, finger width of outer traces is greater than the finger width of inner traces. Fingers 1012-1 through 1012-m have widths greater than fingers 1014-1 through 1014-m'.

Further, as is also illustrated in FIG. 10C, which illustrates a planar view of section 1008 shown in FIG. 10A, m may be greater than m' so that there are a greater number of individual fingers in outer turn 1010-1 than there are in inner turn 1014-1. FIG. 10C illustrates fingers 1014-1 through 1014-m' transitioning to fingers 1012-1 through 1012-m. These transitions may occur throughout coil turns 1002 and may occur in individual turns. Furthermore, each finger may be split independently at multiple times throughout the turns 1002.

Figure 10D:
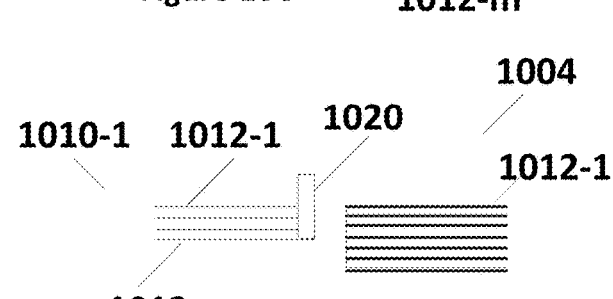

FIG. 10D illustrates a planer view of section 1004 as shown in FIG. 10A. As illustrate in FIG. 10D, tab 1020 is coupled to the beginning of trace 1010-1 with connections to fingers 1012-1 through 1012-m. Furthermore, turn 1010-1, as it transitions to turn 1010-2, includes more fingers 1012-1 through 1012-q (m<q) having a different thickness and arranged such that turns 1002 fills out the empty space, as was illustrated above with respect to FIG. 8C.

Consequently, coil structure 1000 can be optimized for coil resistance by varying the number of fingers and the width of individual fingers in each turn as described with respect to FIGS. 8A through 8C above. The widths of fingers and the number of fingers can be applied to each finger of each turn to optimize the coil resistance. FIGS. 10A through 10D illustrate variation of the width from the outer turns of a coil (trace 1010-1) to the inner turns of the coil (trace 1010-N) to optimize coil resistance. As is shown, the turn-width is optimized at each turn for lowest resistance with more conductor (e.g., copper) width applied at the outer turns because those turns have greater length and less conductor width applied at the inner turns because those turns are shorter. By varying the widths and the number of fingers as described above, the resistance of the outer turns can be reduced. The overall resistance of coil 1000 can be minimized.

As described above, using a higher number of fingers can increase the conductor used in a turn while decreasing the skin effects the number of fingers of in each turn. A higher number of fingers at the outer turns can be used because the outer turns are longer than the inner turns and the larger number of turns will result in the resistance of the outer turns being reduced. A fewer number of fingers can be used at the inner turns because the inner turns are shorter. As a result, in embodiments of the present invention the overall resistance of the coil is minimized. Consequently, the finger design reduces the skin effect and the overall resistance can be optimized by varying the width and number of fingers used throughout the coil.

As described above, resistance optimization can be performed for each finger in a multiple-finger coil. In some embodiments, more conductor width is used in the fingers at the outer turns (e.g. trace 1010-1) and less copper width is used for the fingers at the inner turns (e.g., trace 1010-N). In some embodiments, coil resistance optimization can further be realized by varying the number of fingers of each turn. The outer turns have more finger than the inner turns. The overall resistance of the coil can be reduced.

Figure 11:
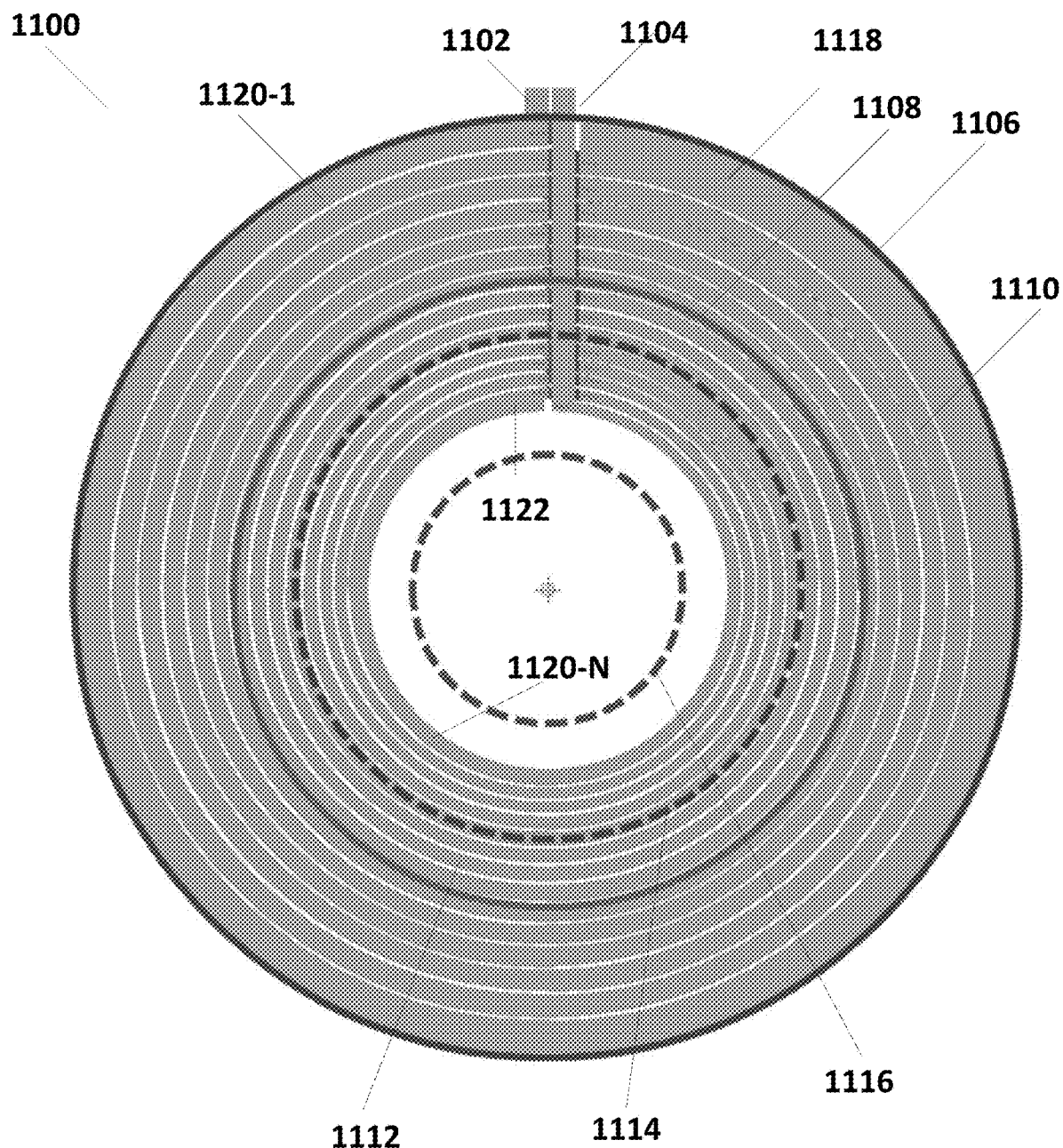
FIG. 11 illustrates an example optimized coil design according to some embodiments of the present invention.

FIG. 11 illustrates a coil 1100 coils 1110 that includes two sections, coil section 1110 and coil section 1112. Coil section 1110 and coil section 1112 are separately optimized with respect to width and thickness of individual ones of turns 1120-1 through 1120-N. Turns 1120-1 to 1120-N coupled between tabs 1102 and 1104. As is illustrated in FIG. 1, the outer diameter (OD) 1106 of segment 1110 and OD 1108 of segment 1112 define segments 1110 and 1112. As is further illustrated in FIG. 11, the radius 1114 is related to the magnetic flux radius of segment 1118 while the radius 1116 indicates the magnetic flux radius of segment 1112.

As is illustrated in FIG. 11, each of turns 1120-1 through 1120-N have varying widths to optimize each segment 1110 and 1112. Further, coil 1120-1 includes a portion 1118 where the conductor fills out to OD 1106 while coil 1120-N includes a portion 1122 where the conductor fills out to an overall inner diameter defined by coil turn 1120-N.

In some embodiments, segment 1112 can include turns 1120 with inner radius of 8 mm to outer radius (OR 1108) of 14 mm. Segment 1110 can include turns 1120 with inner radius of 14 mm and outer radius of 21 mm (OD 1106). Turns 1120 within segment 1112 can be formed with metallic layers of different thickness than those in segment 1110. For example, segment 1112 can have a thickness of 15 μm while segment 1110 is formed with a thickness of 11 μm.

Further, turns 1120 in each segment have varied widths to optimize the function of each segment.

In some embodiments, segment 1112 can include 5.75 turns spaced from radius R=13 mm (OD 1108 is 26 mm) to R=8 mm and segment 1118 includes 8.25 turns spaced from R=13 mm (OD 1108) to R=21.05 mm (OD 1106 of 42.1 mm), for example. These two sets of coils can be optimized to provide the lowest ACRs in their sections by varying both widths and thicknesses. Table I below provides one such example.

Table I illustrates an example of an optimized coil on the design of coil 1100 shown in FIG. 11. In this example, there are 14 turns (e.g., N=14). The overall OD 1106 is 42.1 mm (R=21.05 mm) and the overall ID, the diameter of the innermost coil turns 1120-N, is 16 mm (R=8 mm). The isolation (e.g., distance between individual turns 1120) is 0.1 mm. The coils are formed of copper with a thickness of 55 μm. The operating temperature is assumed to be 25° C. The resistivity of copper is 0.000017 ohm-mm while the temperature coefficient is 3.9E-03/ohm-C. As is illustrated in Table I,

TABLE I

Optimized Coil Parameters

| Turn Diameter (mm) | Top Layer Turn # | Base Width Gain: 1 | Base Delta | Winding DCR | Start Width 1.7 | End Width 0.965 | Top Layer Turn Delta |
|---|---|---|---|---|---|---|---|
| 38.7 | 1 | 0.53 | | 0.0195 | 0.53 | 1.07 | 0.63 |
| 36.46 | 2 | 1.070 | −0.540 | 0.0197 | 1.07 | 1.02 | 1.17 |
| 34.33 | 3 | 1.020 | 0.050 | 0.0196 | 1.02 | 0.965 | 1.12 |
| 32.3 | 4 | 0.965 | 0.055 | 0.0195 | 0.965 | 0.915 | 1.065 |
| 30.36 | 5 | 0.915 | 0.050 | 0.0193 | 0.915 | 0.87 | 1.015 |
| 28.51 | 6 | 0.870 | 0.045 | 0.0191 | 0.87 | 0.825 | 0.97 |
| 26.66 | 7 | 0.825 | 0.045 | 0.0184 | 0.825 | 0.825 | 0.925 |
| 24.83 | 8 | 0.825 | 0.000 | 0.0173 | 0.825 | 0.815 | 0.925 |
| 23.04 | 9 | 0.815 | 0.010 | 0.0164 | 0.815 | 0.795 | 0.915 |
| 21.29 | 10 | 0.795 | 0.020 | 0.0156 | 0.795 | 0.775 | 0.895 |
| 19.65 | 11 | 0.775 | 0.020 | 0.0152 | 0.775 | 0.72 | 0.875 |
| 18.13 | 12 | 0.720 | 0.055 | 0.0152 | 0.72 | 0.66 | 0.82 |
| 16.69 | 13 | 0.660 | 0.060 | 0.0151 | 0.66 | 0.62 | 0.76 |
| 16.01 | 14 | 0.620 | 0.040 | 0.0149 | 0.62 | 0.24 | 0.72 |

In some embodiments, as illustrated in FIG. 11 and in the particular example of Table I, the radius of each of turns 1120-1 through 1120-N can be optimized, along with their widths. The actual radius (13 mm in the above example) is chosen to differ from the geometric radius (14 mm in this case). The method involves characterizing the effective coupling of the two-coil system formed from segment 1110 and segment 1112 and determining the optimized magnetic flux radius (13 mm in this case). This is done to balance volts per turn of the full coil (14 in this case) and also mutual inductance between the two coils in question (5.75 in the above example) at the magnetic flux radius of interest. Particular design for an example is illustrated in FIG. 11.

Using extra available copper area, a shell can be created to lower the resistance of the outer and inner windings. The shell can be round in its outer perimeter, square, or some other shape as limited only by the efficacy of the target wireless power transfer. This can be combined with the optimization for constant/lowest ACR, including variations in coil widths, to produce efficient coils.

The winding widths can be further optimized for different coil geometries. Windings widths can be varied between coil turns that fall with two segments. Each segment can be optimized for different coils flux/coupling characteristics. Each segment can be further optimized by additional criteria, such as ACR as described above.

In some embodiments, a method to choose the optimal partitioning of a coil for two or more magnetic geometries can be obtained. In some embodiments, the method can include identifying a magnetic flux effective radius by characterizing the reluctance of the system. In some embodiments, the method can include designing the coils against this flux radius instead of the geometric radius of the coil turns.

Figure 12:
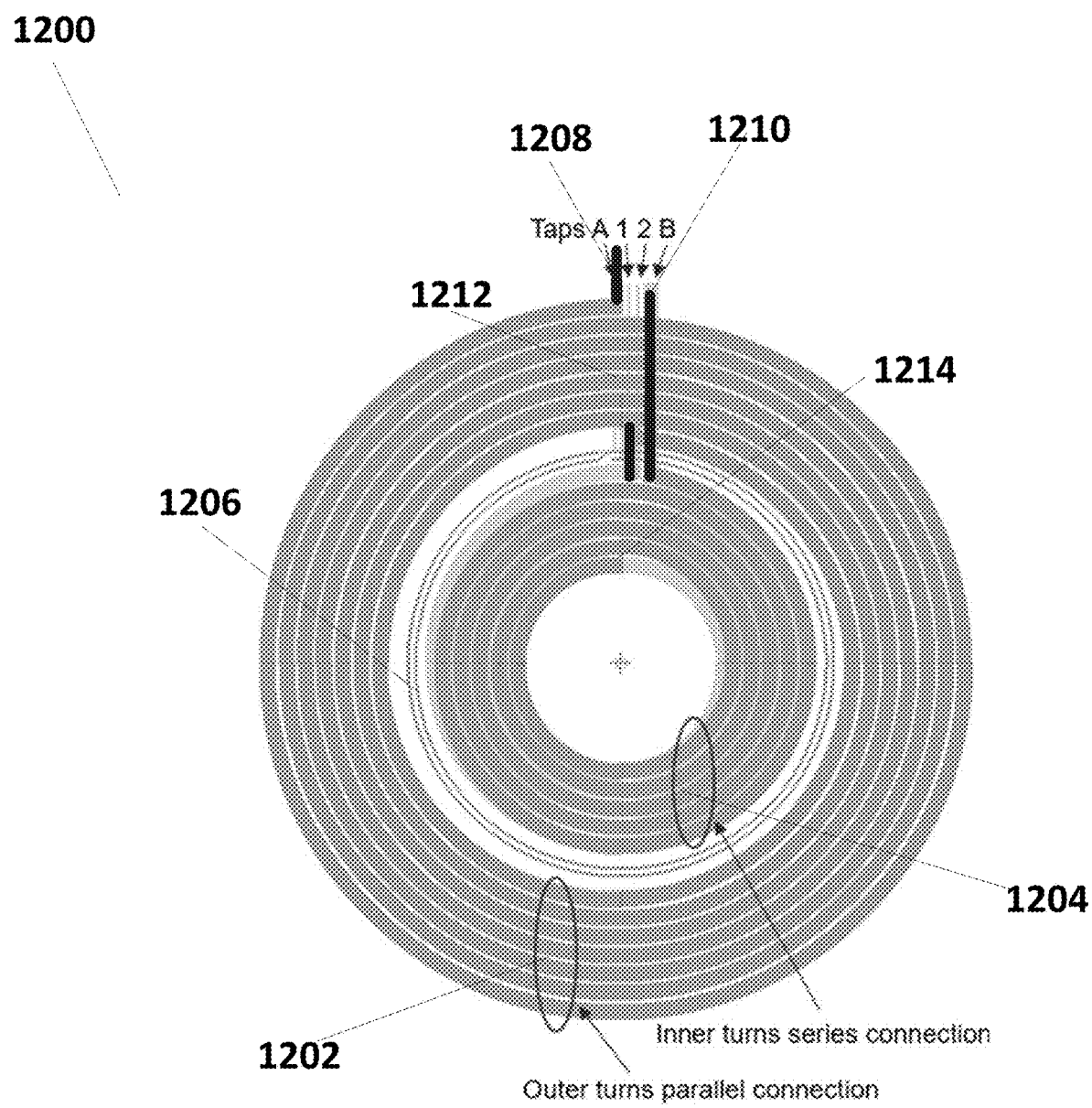
FIG. 12 illustrates another example of optimized coil design according to some embodiments of the present invention.

FIG. 12 illustrates a coil configuration 1200 according to some embodiments of the present invention. As illustrated in FIG. 12, coil configuration 1200 includes outer turns 1202 and inner turns 1204. Tab 1208 is coupled to the outermost turn of outer turns 1202 while tab 1210 is coupled to the innermost turn of inner turns 1204. As is further illustrated in FIG. 12, outer turns 1212 are parallel connected with top and bottom coils connected with vias 1212. Inner turns have top and bottom coils connected in series at connection 1214. Furthermore, as illustrated in FIG. 12, another communication coil 1206 (NXP or other coil) can be provided between inner coil 1204 and outer coil 1202.

The connections between inner turns 1204 and outer turns 1202 can be rearranged to improve mutual inductance in both the TX mode and the RX mode, as is illustrated in the example embodiment of FIG. 12. As illustrated, there can be parallel connection of top and bottom layer coils for outer turns 1202. Outer turns 1202 are for RX coil performance, which picks up the magnetic flux. The diameters of the outer turns can be large. Lower coil resistance results due to the parallel connection and a wider trace width, which is important for RX performance.

Additionally, as is illustrated in FIG. 12, inner turns 1204 includes a series connection of top and bottom layer coils. Inner turns 1204 are for TX coil performance, which generates concentrated magnetic flux. The diameters of the inner turns are small. Higher magnetic coupling to the RX coils can be achieved due to series connection (more turns are allowed), which is important for TX performance.

Transmit coil design is challenging because the solutions to increase efficiency balance total solution thickness with winding resistance, for example AC resistance (ACR), with core saturation. The coil assembly should not be large, so that it can fit within a particular volume needed for a particular application. However, higher ACR results and ferrite core saturation will result in high inefficiencies.

FIG. 13A illustrates a coil assembly 1300 with a coil 1302 mounted on a ferrite core 1304. As discussed above, the width of traces in coil 1302 may vary with radius from the center of coil 1302. In the embodiment illustrated in FIG. 13A, ferrite core 1304 and coil windings 1302 have a set thickness determined by industrial design constraints. The thickness of the ferrite core 1304 can be determined by saturation calculations based on operation conditions of coil assembly 1300. The coil winding 1302 resistance can be helped with optimization of the coil width as a function of radius, as discussed above. As discussed above, the coil width of inner coils of coil 1302, which have a lower path length, can be less than the widths of the outer coil, which have a longer path, in order to reduce the ACR of outer turns of the coil while providing additional turns enhancing the field that may be generated by the inner coils.

FIGS. 13B and 13C illustrate coil 1302 operating as a transmit coil. As is illustrated, a low flux area 1306 is indicated along with higher flux areas 1308 in ferrite layer 1304. Consequently, low flux areas 1306 may have wasted ferrite material while high flux areas 1308 may need the extra thickness. As is illustrated in FIGS. 13A and 13B, since the field is higher in high flux area 1308 at the inner edge of coil 1302, a thicker ferrite can be used at the inner edge of the coil and a thinner ferrite can be used at the outer edge where there is a lower flux density 1306. Conversely, the highest resistance is at the outer edge of the coil 1302 due to the length of the outer windings. These two design constraints occur at opposite ends and therefore a coil can beneficially accommodate these constraints.

In some embodiments of the present invention, the thickness of the ferrite core can be varied with the expected flux strength. Consequently, in the areas where the ferrite core is thinner, the thickness of the traces of the coil can be increased, which can reduce the resistance of the coil. FIGS. 14A and 14B illustrate a coil 1402 on a ferrite core 1404 according to some embodiments of the present invention. As illustrated in FIGS. 14A and 14B, coil 1402 includes turns that are thinner on the inside turns of coil 1402 and thicker on the outside turns of coil 1402. Conversely, ferrite core 1404 is correspondingly thicker under the inside turns of coil 1402 and thinner under the outside turns of coil 1402. In some embodiments, the coil 1402 is a varied thickness throughout, with the thicker ferrite core under the inner turns of the coil being compensated by the thinner coil thickness and the thicker coil thickness of the outer turns being compensated by a thinner ferrite core under the outer turns.

Consequently, as illustrated in FIGS. 14A and 14B, there can be a tradeoff to reduce ferrite thickness at the outer edges of coil 1402 in favor of increased thickness of traces 1406, which reduces coil ACR without increasing saturation risk. Conversely, the ferrite thickness can be increased at the inner edge of coil 1402 with a decreased winding thickness, which allows for thinner over all coil design or increased current (power) in the coil and mitigates ferrite saturation at the coil edge.

Consequently, coils according to some embodiments reduce ferrite thickness at edges or locations of the coil where saturation is not a concern. The freed thickness budget can be used to increase winding thickness. Increased winding thickness reduces ACR/DCR of the winding, which improves coil/system performance and allows easier TRx system implementation (better impedance matching).

FIG. 15 illustrates a system 1500 that can be used according to the present invention with embodiments of TRx coil 1526 as described above. As is illustrated in FIG. 15, TRx coil 1526 is coupled to tab configuration 1520. Tab configuration 1520 is coupled to capacitor circuit 1514. Capacitor circuit 1514 is coupled to transmit/receive circuit 1508. A microcontroller 1530 is coupled to each of tab configuration 1520, capacitor circuit 1514, and transmit/receive circuit 1508. As is illustrated in FIG. 15, tab configuration 1520 includes a Tx tab configuration 1522 and Rx tab configuration 1524. In Tx tab configuration 1522, tabs to TRx coil 1526 that correspond to a Tx coil configuration are coupled. In Rx tab configuration 1524, tabs to TRx coil 1526 that correspond to a Rx coil configuration are coupled. In some embodiments, as described above, TRx coil 1526 includes two tabs and in some embodiments more than two tabs are used.

As is further illustrated in FIG. 15, capacitor circuit 1514 includes a Tx capacitor configuration 1516 and a Rx capacitor configuration 1518. In Tx mode, Tx capacitor configuration 1516 provides appropriate capacitance to TRx coil 1526. In Rx mode, Rx capacitor configuration 1518 provides appropriate capacitance to TRx coil 1526.

As is also illustrated in FIG. 15, transmit/receive circuit 1508 includes a Tx driver configuration 1510 and a Rx rectifier configuration 1512. In Tx mode, Tx driver configuration 1510 receives power from power source 1502 and switches a switching network to apply AC power across the Tx configuration of TRx coil 1526. In Rx mode, Rx driver configuration 1512 receives power from the Rx configuration of TRx coil 1526, provides rectification, and provides power to load 1506.

Microcontroller 1530 is coupled to transmit/receive circuit 1508, capacitor circuit 1514, and tab configuration 1520. Microcontroller 1530 includes a processor, memory, and supporting circuitry. Memory includes both volatile and non-volatile memory sufficient to store programming instructions for the processor, parameters, and data to execute the functions of system 1500. Microcontroller 1530 can set parameters for operation in various sections of system 1500 and also switches system 1500 between a Tx mode and a Rx mode. In Tx mode, microcontroller 1530 sets transmit/receive circuit to Tx driver configuration 1510, sets capacitor circuit 1514 to Tx capacitor configuration 1516, and sets Tab circuit 1520 to Tx tabs 1522. In Rx mode, microcontroller 1530 sets transmit/receive circuit to Rx rectifier configuration 1512, sets capacitor circuit 1514 to Rx capacitor configuration 1518, and sets tab circuit 1520 to Rx tab configuration 1524.

Additionally, if TRx coil 1526 includes a communications coil, for example an NXP coil, then microcontroller 1530 can be coupled to communications block 1528. Communications block 1528 is then coupled to drive communications coil in TRx coil 1526. Further, microcontroller 1530 can provide adjustments to system 1500 to operate system 1500 in an optimal fashion considering the characteristics of TRx coil 1526 and the available adjustments that may be made in Transmit/receive circuit 1508, capacitor circuit 1514, and tabs circuit 1520.

In some embodiments, microcontroller 1530 can adjust Tx driver configuration such that the Tx operating frequency point can be optimized. Tx driver configuration 1510 typically includes switching transistors that are driven at a particular switching frequency by a driver circuit in order to supply current through the Tx configuration of TRx coil 1526. In Tx mode, the operating frequency point can be tuned such that the best efficiency is achieved at the most frequently used Rx charging conditions. Wireless charging usually happens at constant current mode (CC mode) of a receiver brought into proximity of TRx coil 1526 while system 1500 is in Tx mode. High efficiency operation provides for good thermal performance so that over-temperature conditions during wireless charging can be avoided.

In many situations, the best efficiency conditions during Tx mode are usually achieved at the highest allowed operating frequency. With higher operating frequency, the Tx coil current is lower for a particular induced voltage. Therefore, the power loss at higher operating frequencies is lower. When the highest allowed operating frequency achieved, the system may operate in duty cycle mode. Duty cycle mode refers to the period of the cycle where a high voltage is applied across Tx coil configuration of TRx coil 1526. During the remaining period of the cycle the Tx coil configuration of TRx coil 1526 is coupled to a low voltage such as ground. In duty cycle mode, the frequency may be lower. In some embodiments, microcontroller 1530 may tune Tx driver configuration 1510 to maximize the duty cycle. In some cases, Tx switching frequency can be set according to a resonance circuit that involves components of system 1500 and components of a receiver brought into proximity with system 1500.

TRx coil 1526 can, for example, be any of the embodiments described above. As discussed above, Tx coil tuning can be performed in many fashions, including varying coil diameters, winding turn widths, and winding turn thicknesses. Tx coils are tuned to have high mutual inductance between Rx coils in TRx coil 1526 as discussed above so that high efficiency of wireless transfer of power can be achieved. The operating frequency point can be tuned by adjusting Tx driver configuration 1510, Tx capacitor configuration 1516, and sometimes Tx tab configuration 1522. The operating frequency can be tuned by the following factors for tuning the operating frequency of system 1500 in Tx mode: 1) TX coil self-inductance; 2) TX coil and RX coil mutual inductance; 3) tuning capacitance; and 4) input voltage (e.g., the voltage from power source 1502). The input voltage is usually determined by the system design of system 1500. TX coil self-inductance and the mutual inductance are usually linked parameters that are determined by coil design. Varying trace widths and thicknesses as discussed above provides more design freedom for these two parameters.

Other methods of improving operation of system 1500 include sharing capacitors, adjusting On-The-Go (OTG) Voltage Method to Optimize the System Operating Point, and/or Optimization of the Deadtime for transmission of energy. These additional methods of optimizing system 1500 are discussed further below.

Sharing the TRx coil and tuning capacitors in capacitor circuit 1514 can also increase the efficiency of the system. When system 1500 is in Rx mode, Rx capacitor configuration 1518 includes coil and tuning capacitors and reflect that the Rx coil configuration of TRX coil 1526 has large radius to receive more magnetic flux from a corresponding Tx coil of a proximate transmitter. Rx capacitor configuration 1518 helps tune system 1500 in Rx mode such that the LC (coil inductor and tuning capacitors) impedance at the operating frequency range is 1) inductive, and 2) low impedance. In such a way, more power can be coupled to load 1506.

Coil and tuning capacitors in Tx capacitor configuration 1516 during Tx mode reflect that the TX coil configuration of TRx coil 1526 generates high magnetic flux at the center area (or high mutual inductance in another words). Coil design methods to improve the mutual inductance can be implemented in the design of TRx coil 1526 as discussed above. The TX system is tuned such that the LC impedance at the operating frequency range is inductive, and the best operating frequency point can be achieved, as discussed above.

The TRx coil configuration of TRx coil 1526 and tuning capacitors of capacitor circuit 1514 can be shared between the Tx mode and Rx mode of system 1500. In the Tx mode, operating frequency point can be tuned with the factors of 1) TX coil self-inductance; 2) TX coil and RX coil mutual inductance; 3) tuning capacitance; and 4) input voltage. The input voltage is usually determined by the system design and is the input from power source 1502. TX coil self-inductance and the mutual inductance are usually linked parameters and can. Adjusting trace width and thickness to optimize coils provides more design freedom for these two parameters. With the requirements above, TRx coil 1526 and the tuning capacitors in capacitor circuit 1514 can be shared. As a result, the system and circuit/chip requirement can be greatly simplified.

In some embodiments, the Tx mode zero-voltage switching (ZVS) capacitor and RX mode communication capacitors can be shared. With regard to the TX mode ZVS capacitor, hard switching usually causes EMI issues. ZVS capacitors are added at the switching nodes in Tx mode to slow down the switching transient and to improve the EMI performance. With regard to the RX Mode Communication Capacitor, communication capacitors are usually used in RX mode with either WPC or PMA Wireless Charging standards. Communication capacitors are also connected to the switching nodes. Consequently, capacitors in capacitor circuit can be used as ZVS capacitors in Tx capacitor configuration 1516 and can be used as communications capacitors in Rx capacitor configuration 1518.

Sharing the Tx mode ZVS Capacitor with the RX Mode Communication Capacitor greatly simplifies the system. In the Tx capacitor configuration 1516 for Tx mode, the ZVS capacitors are grounded through switches. In Rx capacitor configuration 1518 for RX mode, the communication capacitors are grounded or floating through switches according to the communication modulation methods.

Additionally, the OTG voltage can be used to optimize the system operating point. The OTG voltage generally is the voltage output of transmitter/receiver circuit 1508 when Rx rectifier configuration 1512 is active, or in other words the input voltage to load 1506. As discussed above, the TX coil configuration of TRx coil 1526 can be tuned. Further, in Tx mode the operating frequency point can be tuned with the factors of 1) TX coil self-inductance; 2) TX coil and RX coil mutual inductance; 3) tuning capacitance; 4) input voltage. In addition to the TRx coil (factors of self-inductance and mutual inductance) and tuning capacitance, the input voltage provides another factor for system operating point tuning. It can greatly simplify the TRX coil design requirement and tuning approach.

The OTG Voltage can also be used to tune the interaction. In RX mode, the wireless power receiver circuit output from Rx rectifier configuration 1512 can be connected to the power management IC (PMIC) DC input of load 1506. The PMIC DC input is the output terminal at the PMIC OTG mode. Therefore, in TX mode the wireless power transmitter circuit of Tx driver configuration 1510 input is naturally connected to the PMIC OTG mode output from load 1506 as well as power source 1502. System Operating Point Tuning can then be achieved by increasing the OTG voltage when more power is needed from the Rx mode and lowering the OTG voltage when less power is needed from the Rx mode. Therefore, tuning can be achieved by increasing the OTG voltage when the operating frequency is low.

The deadtime during Tx mode of system 1500 can also be optimized. With a short deadtime, hard switching occurs, which causes bad EMI performance and power loss resulting in low efficiency. With a long deadtime, however, in the TX mode the inverter (which can be the synchronous rectifier at during RX mode) can function in diode mode during the deadtime when switching is finished. Power loss will be caused in diode mode and this results in low efficiency.

The Deadtime can be optimized in some embodiments by setting the deadtime to be equal to the switching time implemented by Tx driver configuration 1510. Therefore, the switching is ZVS (instead of hard switching). Further, there is no time for the switches to enter diode mode. The optimization can be made for the most frequently used Rx charging condition (usually the Rx is operating in constant current mode). The optimization can also be made based on the selected ZVS capacitance in Tx driver configuration 1510.

Further, increased efficiency can be implemented in microcontroller 1530 for Foreign Object Detection (FOD) methods. Power loss, monitoring of operating parameters, and Control Error Packet (CEP) monitoring can be used to detect foreign objects. In the power loss method, microcontroller 1530 calculates the input power from the input voltage from power source 1502 and the input current information, receives the Rx received power information from RPP (received power packet) information through WPC communication, and compares the TX input power and RX received power to determine if there is foreign object nearby. A loss of power over a certain threshold can be used to determine the presence of a foreign object.

In the operating parameters method, record the operating parameters at normal operation at various power level and various X-Y-Z locations of TRx coil 1526. Abnormal operating parameters may indicate that there is foreign object nearby. These operating parameters can be: 1) signal strength, 2) operating frequency, 3) RPP, 4) input power, or other parameters.

In the CEP method, record the CEP (control error packet) at normal operation when there is input voltage drop (10% drop for example) or frequency drop (10% drop for example). Larger CEP will happen when there is foreign object nearby with the same input voltage drop or frequency drop.

In summary, embodiments of the present invention include TRx coils with optimized trace widths at each winding. The trace width at each turn is optimized to improve the magnetic flux so that the mutual inductance can be improved to achieve better TX performance. Thinner trace widths can be used at the inner winding and wider trace widths can be used at the outer winding. In some embodiments, two or more trace widths can be used in the coil windings. This results in various benefits. By such design, larger inner radius and/or less number of turns are allowed, so that better RX performance is achieved. By such design, proper self-inductance and mutual inductance can be achieved because another factor (ratio of outer turn trace width and inner turn trace width) is introduced, so that proper system level tuning can be achieved which can greatly simplify the system level (or circuit level) requirement. By such design, smaller coil area is allowed, so that other coils such as NFC and/or PMA are compatible with the coil design.

In addition to optimizing trace widths or thicknesses for each winding, some embodiments can re-arrange connection of outer turns and inner turns for optimization. Further, embodiments can include optimization of TX Operating Frequency Point, sharing TRX Coil and Tuning Capacitors, sharing TX Mode ZVS Capacitor and RX Mode Communication Capacitor, OTG Voltage Method to Optimize the System Operating Point, and optimization of the Deadtime. Further, FOD methods can be implemented. These FOD methods include monitoring Power Loss, monitoring Operating Parameters, and monitoring CEP.

The above detailed description is provided to illustrate specific embodiments of the present invention and is not intended to be limiting. Numerous variations and modifications within the scope of the present invention are possible. The present invention is set forth in the following claims.

What is claimed is:
1. A coil for wireless power transmission, comprising:
a winding comprising a plurality of turns of conductive traces mounted on a substrate, the plurality of turns of the winding being configurable to form a receive coil and a transmit coil,
wherein the plurality of turns varies the width of the conductive traces to enhance operation of the coil,
wherein each of the plurality of turns is formed of a plurality of fingers, the plurality of fingers in the plurality of turns is varied in width and/or number of fingers across the winding,
wherein the plurality of turns is separated into outer turns and inner turns, each of which is formed to top traces and bottom traces formed on opposite sides of the substrate, the top traces and bottom traces of the outer turns being coupled together in parallel, and the top traces and bottom traces of the inner turns being coupled in series together and in series with the parallel coupled traces of the outer turns.

2. The coil of claim 1, wherein the plurality of turns of the winding are coupled to a plurality of terminals, wherein the plurality of turns are arranged with the plurality of terminals such that a transmit coil is formed between a first pair of the plurality of terminals and a receive coil is formed between a second set of the plurality of terminals.

3. The coil of claim 2, wherein the plurality of terminals includes one of two, three, or four terminals.

4. The coil of claim 1, wherein the plurality of turns is separated into outer turns and inner turns and wherein a space separates the outer turns and the inner turns, the outer turns being coupled to receive terminals to form the receive coil and the inner turns being coupled to transmit terminals to provide the transmit coil, the space being sufficient to accommodate communications coils positioned between the outer turns and the inner turns.

5. The coil of claim 1, wherein unused portions of the substrate between the plurality of turns is partially filled with a conductor coupled to the turns to reduce coil resistance.

6. The coil of claim 1, wherein the plurality of turns are separated into outer turns and inner turns formed within the outer turns, wherein the width of inner turns is less than the width of outer turns.

7. The coil of claim 1, wherein the winding includes
an outer coil wherein traces of the outer coil increase in width from an inner trace to an outer trace, the outer coil being configured to form the receive coil; and
an inner coil wherein traces of the inner coil have less width than that of the outer coil, the inner coil being configured to form the transmit coil.

8. The coil of claim 7, wherein the width of traces forming the one or more turns is varied stepwise across the plurality of turns.

9. The coil of claim 7, wherein the width of traces forming the plurality of turns is varied continuously across the winding.

10. The coil of claim 7, wherein the trace widths of the transmit coil and the receive coil each include two or more distinct widths.

11. The coil of claim 1, wherein the plurality of fingers vary in the width of the fingers in each turn.

12. The coil of claim 1, wherein the plurality of fingers vary in the number of fingers in each turn.

13. The coil of claim 12, wherein the number of fingers is greater in outer turns of the plurality of turns than it is in inner turns of the plurality of turns.

14. The coil of claim 1, wherein the substrate includes a ferrite core and wherein the plurality of turns are thinner on inner turns of the winding and thicker on outer turns of the winding, the ferrite core on which the coil is mounted being thicker under the inner turns of the winding and thinner under the outer turns of the winding.

15. The coil of claim 1, wherein the coil is electronically coupled to a control circuit, the control circuit comprising:

a transmit circuit coupled to drive the plurality of turns configured to form the transmit coil in a transmit functionality;

a receive circuit coupled to the plurality of turns configured to form the receive coil in a receive functionality; and a controller that determines between a transmit mode and a receive mode and, in transmit mode, activates the transmit circuit and, in receive mode, activates the receive circuit.

16. The coil of claim 15, wherein the transmit circuit includes a transmit driver; and transmit capacitors coupled to the transmit driver.

17. The coil of claim 16, wherein the transmit circuit and the receive circuit share one or more capacitors.

18. The coil of claim 16, wherein one or more of a transmit operating frequency, an on-the-go voltage, and a deadtime is adjusted for efficiency.

* * * * *